United States Patent
Yamamoto et al.

(10) Patent No.: US 11,593,182 B2
(45) Date of Patent: Feb. 28, 2023

(54) STORAGE SYSTEM

(71) Applicant: Hitachi, Ltd., Tokyo (JP)

(72) Inventors: Takahiro Yamamoto, Tokyo (JP); Yuki Sakashita, Tokyo (JP); Shintaro Ito, Tokyo (JP); Masakuni Agetsuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/471,255

(22) Filed: Sep. 10, 2021

(65) Prior Publication Data

US 2022/0382602 A1 Dec. 1, 2022

(30) Foreign Application Priority Data

May 28, 2021 (JP) .............................. JP2021-090224

(51) Int. Cl.
*G06F 9/46* (2006.01)
*G06F 9/50* (2006.01)
*G06F 3/06* (2006.01)

(52) U.S. Cl.
CPC .......... *G06F 9/5083* (2013.01); *G06F 3/0608* (2013.01); *G06F 3/0644* (2013.01); *G06F 3/0683* (2013.01)

(58) Field of Classification Search
CPC .................................................. G06F 3/0608
USPC ....................................................... 718/105
See application file for complete search history.

(56) References Cited

U.S. PATENT DOCUMENTS

| | | | | |
|---|---|---|---|---|
| 9,043,530 | B1* | 5/2015 | Sundaram | G06F 3/0656 711/158 |
| 9,357,007 | B2* | 5/2016 | Hasegawa | H04L 67/1097 |
| 9,690,670 | B1* | 6/2017 | Paulzagade | G06F 11/1464 |
| 10,613,755 | B1* | 4/2020 | Sela | G06F 3/061 |
| 2006/0200456 | A1* | 9/2006 | Zohar | G06F 21/604 |
| 2007/0067583 | A1* | 3/2007 | Zohar | G06F 11/1458 711/173 |
| 2009/0144732 | A1* | 6/2009 | Tanaka | G06F 3/0631 718/1 |
| 2009/0222631 | A1* | 9/2009 | Sugiura | G06F 3/0649 711/E12.001 |
| 2010/0077168 | A1* | 3/2010 | Arakawa | G06F 3/0605 711/E12.002 |
| 2010/0082899 | A1* | 4/2010 | Nakajima | G06F 9/5077 711/E12.001 |
| 2010/0332778 | A1* | 12/2010 | Wada | G06F 3/0665 711/E12.001 |
| 2011/0202737 | A1* | 8/2011 | Takahashi | G06F 11/201 711/E12.103 |

(Continued)

*Primary Examiner* — Mehran Kamran
(74) *Attorney, Agent, or Firm* — Mattingly & Malur, PC

(57) ABSTRACT

A storage system including a processor performs a process for providing a volume including a plurality of areas to one or more hosts. One or more storage devices are connected to the processor and store data of the volume, in which each of a plurality of nodes monitors a load of the volume provided by an own node and loads of areas obtained by dividing an area of the volume into a plurality of the areas, and a first node determining that the load of the one volume being monitored is equal to or more than a threshold value migrates a portion of the area included in the one volume to a volume of a second node different from the first node according to the load of the areas obtained by dividing the area of the one volume into the plurality of areas and a policy of load sharing.

17 Claims, 23 Drawing Sheets

(56) References Cited

U.S. PATENT DOCUMENTS

| | | | |
|---|---|---|---|
| 2013/0073820 A1* | 3/2013 | Watanabe | G06F 3/0659 |
| | | | 711/E12.103 |
| 2013/0097377 A1* | 4/2013 | Satoyama | G06F 3/0685 |
| | | | 711/E12.016 |
| 2013/0227145 A1* | 8/2013 | Wright | H04L 67/1008 |
| | | | 709/226 |
| 2013/0282887 A1* | 10/2013 | Terayama | G06F 3/061 |
| | | | 709/223 |
| 2015/0142738 A1* | 5/2015 | Fujii | G06F 16/273 |
| | | | 707/613 |
| 2015/0363459 A1* | 12/2015 | Kadoda | G06F 16/1734 |
| | | | 707/736 |
| 2016/0041789 A1* | 2/2016 | Mills | G06F 3/0674 |
| | | | 711/111 |
| 2016/0308726 A1* | 10/2016 | Dennis | H04L 41/0896 |
| 2016/0371145 A1* | 12/2016 | Akutsu | H03M 13/2906 |
| 2018/0039444 A1* | 2/2018 | Yamamoto | G06F 3/0688 |
| 2018/0131758 A1* | 5/2018 | Lee | G06F 21/80 |
| 2018/0246670 A1* | 8/2018 | Baptist | G06F 3/0659 |
| 2019/0212937 A1* | 7/2019 | Hara | G06F 16/128 |
| 2019/0265915 A1* | 8/2019 | Greenwood | G06F 3/0619 |
| 2020/0073575 A1* | 3/2020 | Cai | G06F 16/1734 |
| 2021/0042051 A1* | 2/2021 | Ito | G06F 3/0659 |
| 2021/0103399 A1* | 4/2021 | Lyu | G06F 3/0673 |
| 2021/0286541 A1* | 9/2021 | Kucherov | G06F 3/0604 |
| 2021/0303169 A1* | 9/2021 | Tagar | G06F 3/0644 |

* cited by examiner

FIG. 1
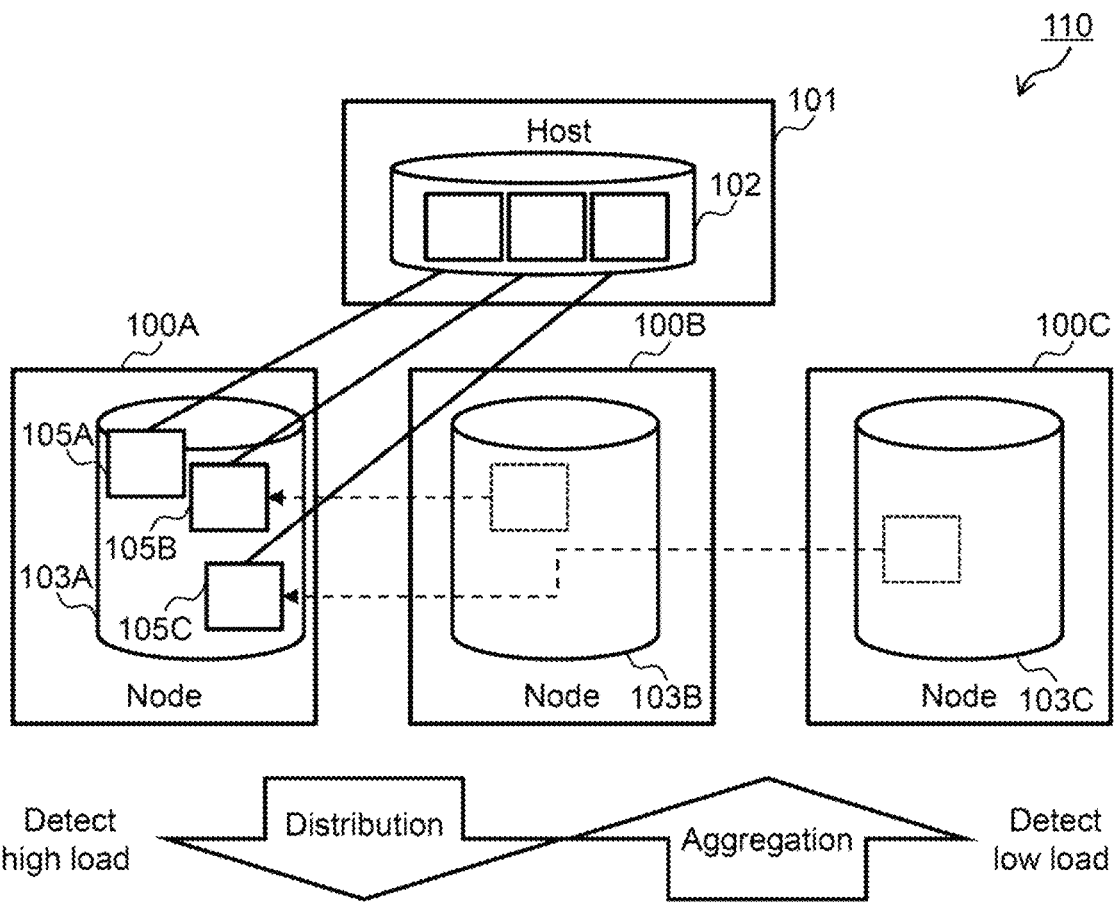
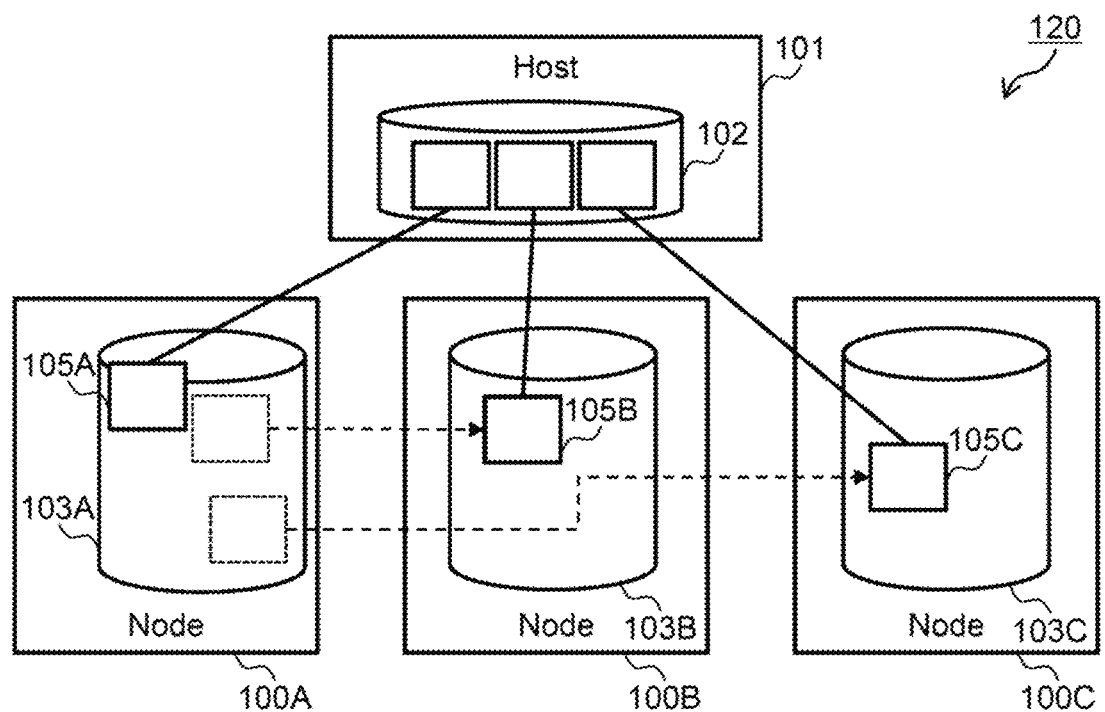

FIG. 6

DATA PROTECTION SET MANAGEMENT TABLE — 412

POOL VOLUME MANAGEMENT TABLE — 610

| POOL VOLUME ID | SIZE | PARITY GROUP ID | LOGICAL DRIVE ID |
|---|---|---|---|
| 0 | 256 GB | 0 | 0 |
| 1 | 341 GB | 1 | 3 |
| 2 | 341 GB | 2 | 6 |

611, 612, 613, 614

PARITY GROUP MANAGEMENT TABLE — 620

| PARITY GROUP ID | REDUNDANTIZATION POLICY | LOGICAL DRIVE ID LIST |
|---|---|---|
| 0 | Mirroring | 0, 1, 2 |
| 1 | EC(2D1P) | 3, 4, 5 |
| 2 | EC(2D1P) | 6, 7, 8 |

621, 622, 623

LOGICAL DRIVE MANAGEMENT TABLE — 630

| LOGICAL DRIVE ID | START OFFSET | SIZE | DRIVE ID |
|---|---|---|---|
| 0 | 0x00000000 | 512 GB | 0 |
| 1 | 0x00000000 | 512 GB | 1 |
| 2 | 0x00000000 | 512 GB | 3 |

631, 632, 633, 634

STRIPE MAPPING TABLE — 640

EC(2D1P) — 641

| | N0 | N1 | N2 |
|---|---|---|---|
| #0 | A1 | B1 | C1 |
| #1 | C2 | A2 | B2 |
| #2 | Bp | Cp | Ap |
| #3 | D1 | E1 | F1 |
| #4 | F2 | D2 | E2 |
| #5 | Ep | Fp | Dp |

Mirror (2-Rep.) — 642

| | N0 | N1 | N2 |
|---|---|---|---|
| #0 | A1 | B1 | C1 |
| #1 | Cp | Ap | Bp |
| #2 | D1 | E1 | F1 |
| #3 | Fp | Dp | Ep |
| #4 | G1 | H1 | I1 |
| #5 | Ip | Gp | Hp |

*FIG. 7*

STORAGE POOL MANAGEMENT TABLE

STORAGE POOL INFORMATION TABLE

| STORAGE POOL ID | TOTAL CAPACITY | USED CAPACITY | NODE ID | POOL VOLUME ID LIST |
|---|---|---|---|---|
| 0 | 50 TB | 27 TB | 0 | 0, 1, 2, |
| 1 | ... | ... | 1 | 3, 4, 5, |

FIG. 8

VOLUME MANAGEMENT TABLE — 414

VIRTUAL VOLUME MANAGEMENT TABLE — 810

| VIRTUAL VOLUME ID | SIZE | SLICE ID LIST | MAXIMUM DISTRIBUTION DEGREE |
|---|---|---|---|
| 0 | 400 GB | 0, 1, | 8 |
| 1 | 1000 GB | 2, 3, 4, 5, 6 | 8 |
| 2 | 1000 GB | 7, 8, 9, 10, 11 | 16 |
| 811 | 812 | 813 | 814 |

SLICE MANAGEMENT TABLE — 820

| SLICE ID | SIZE | STORAGE POOL ID | STATE |
|---|---|---|---|
| 0 | 200 GB | 0 | Normal |
| 1 → 12 | 200 GB | 0 → 1 | Migrating |
| 2 | 200 GB | 1 | Normal |
| 821 | 822 | 823 | 824 |

PAGE MAPPING TABLE — 830

| PAGE ID | VIRTUAL VOLUME ID | VIRTUAL VOLUME LBA | SIZE | POOL VOLUME ID | POOL VOLUME LBA |
|---|---|---|---|---|---|
| 0 | 0 | 0x00000000 | 128 MB | 0 | 0x000000 |
| 1 | 1 | 0x00000000 | 128 MB | 0 | 0xC00000 |
| 2 | 2 | 0x06400000 | 64 MB | 1 | 0x800000 |
| ... | ... | ... | ... | ... | ... |
| 831 | 832 | 833 | 834 | 835 | 836 |

FIG. 9

MONITOR INFORMATION MANAGEMENT TABLE

PROCESSOR MONITOR INFORMATION MANAGEMENT TABLE

| NODE ID | PROCESSOR ID | PROCESS ID | PROCESS NAME | USAGE RATE |
|---|---|---|---|---|
| 0 | 0 | 2304 | Storage Program | 50% |
| 0 | 1 | 2401 | App1 | 20% |

DRIVE MONITOR INFORMATION MANAGEMENT TABLE

| DRIVE ID | READ IOPS | WRITE IOPS | READ TRANSFER AMOUNT | WRITE TRANSFER AMOUNT | USAGE RATE |
|---|---|---|---|---|---|
| 0 | 100 | 50 | 800 KB/s | 200 KB/s | 20% |
| 1 | 200 | 600 | 1.6 MB/s | 2.4 MB/s | 50% |

NETWORK MONITOR INFORMATION MANAGEMENT TABLE

| NODE ID | NIC ID | TRANSMISSION TRANSFER AMOUNT | RECEPTION TRANSFER AMOUNT | MAXIMUM TRANSFER AMOUNT |
|---|---|---|---|---|
| 0 | 0 | 1000 bps | 2000 bps | 10 Gbps |
| 1 | 1 | 5000 bps | 6000 bps | 25 Gbps |

SLICE MONITOR INFORMATION MANAGEMENT TABLE

| SLICE ID | READ COUNTER | WRITE COUNTER | READ TRANSFER AMOUNT | WRITE TRANSFER AMOUNT | MONITOR START TIME |
|---|---|---|---|---|---|
| 0 | 100 | 500 | 300 MB | 2000 MB | 00:00:00 |
| 1 | 1000 | 20 | 5000 MB | 50 KB | 00:00:00 |

FRONT-END PATH MONITOR INFORMATION MANAGEMENT TABLE

| PATH ID | READ IOPS | WRITE IOPS | READ TRANSFER AMOUNT | WRITE TRANSFER AMOUNT |
|---|---|---|---|---|
| 0 | 100 | 50 | 800 KB/s | 200 KB/s |
| 1 | 200 | 600 | 1.6 MB/s | 2.4 MB/s |

FIG. 10

FRONT-END PATH MANAGEMENT TABLE (416)

FRONT-END PATH INFORMATION TABLE (1010)

| PATH ID | VIRTUAL VOLUME ID | INITIATOR ID | ALUA SETTING | CONNECTION NODE ID |
|---|---|---|---|---|
| 0 | 0 | iqn-xxxx | Optimize | 0 |
| 1 | 0 | iqn-yyy | Non-Optimize | 1 |
| 2 | 1 | iqn-zzz | Optimize | 0 |

1011　1012　1013　1014　1015

STORAGE SYSTEM

CROSS-REFERENCE TO RELATED APPLICATION

The present application claims priority from Japanese application JP 2021-090224, filed on May 28, 2021, the contents of which is hereby incorporated by reference into this application.

BACKGROUND OF THE INVENTION

1. Field of the Invention

The present invention generally relates to a technique for distributing loads of a volume.

2. Description of Related Art

US-A-2016/0371145 discloses a storage system in which a plurality of servers are connected by a network, one storage pool is provided by integrating local storages of servers by storage control software, and a volume is provided from the storage pool. When writing data to the volume, the storage system protects a data from server failure by combining data stored indifferent servers, calculating a parity, and storing the data in a server different from the data. The storage system is characterized in that capacity and performance of a storage can be scaled out by addition of a server.

In addition, US-A-2016/0371145 discloses a technique in which an access frequency for a data written to a volume is collected, and data arrangement is changed so that a data having a high access frequency is stored in a local storage, a data having a low access frequency is stored in a storage of a different server (herein, referred to as a remote storage). When a host accesses the data of the volume, the host accesses the server to which the local storage of the volume is allocated, determines whether the data is in the local storage in the server or the remote storage, and when the data is in the remote storage, the host transfers access to the different server to access the data. The data hiving a high access frequency is stored in the local storage in this manner, and thus, the data can be accessed without using the network, so that it is possible to respond to the host at a high speed.

When a volume is provided to a host based on the technique described in US-A-2016/0371145, the volume is always accessed via a server having a local storage. For this reason, the performance of one volume becomes the upper limit of the performance of the server having the local storage. The storage system is characterized in that performance of the storage system is scaled out by adding a server. In the technology disclosed in US-A-2016/0371145, the system performance (total performance of a plurality of volumes) can be scaled out by adding the server, but the performance of one volume cannot be scaled out even if the server is added.

SUMMARY OF THE INVENTION

The present invention is to provide a storage system or the like in which system performance can be scaled out when a server (node) is added and the performance can be scaled out even for one volume.

According to one embodiment, there is provided a storage system including: a plurality of nodes including a processor that performs a process for providing a volume including a plurality of areas to one or more hosts; and one or more storage devices that are connected to the processor and store data of the volume, in which each of the plurality of nodes monitors a load of the volume provided by an own node and loads of areas obtained by dividing an area of the volume into a plurality of the areas, and a first node determining that the load of the one volume being monitored is equal to or more than a threshold value migrates a portion of the area included in the one volume to a volume of a second node different from the first node according to the load of the areas obtained by dividing the area of the one volume into the plurality of areas and a policy of load sharing.

In the above-described configuration, when the load of one volume is increased, a portion of the area of the volume is migrated to the volume of another node, and thus, for example, when a node is added, it is possible to scale out the performance for one volume as well.

According to the present invention, it is possible to implement a storage system capable of scaling out a performance of one volume.

BRIEF DESCRIPTION OF THE DRAWINGS

FIG. 1 is an image diagram illustrating an outline of allocation change of a data of a volume according to a first embodiment;

FIG. 6 is a diagram illustrating an example of a data protection set management table according to the first embodiment;

FIG. 7 is a diagram illustrating an example of a storage pool management table according to the first embodiment;

FIG. 8 is a diagram illustrating an example of a volume management table according to the first embodiment;

FIG. 9 is a diagram illustrating an example of a monitor information management table according to the first embodiment;

FIG. 10 is a diagram illustrating an example of a front-end path management table according to the first embodiment;

DESCRIPTION OF EMBODIMENTS

(I) First Embodiment

Figure 2:
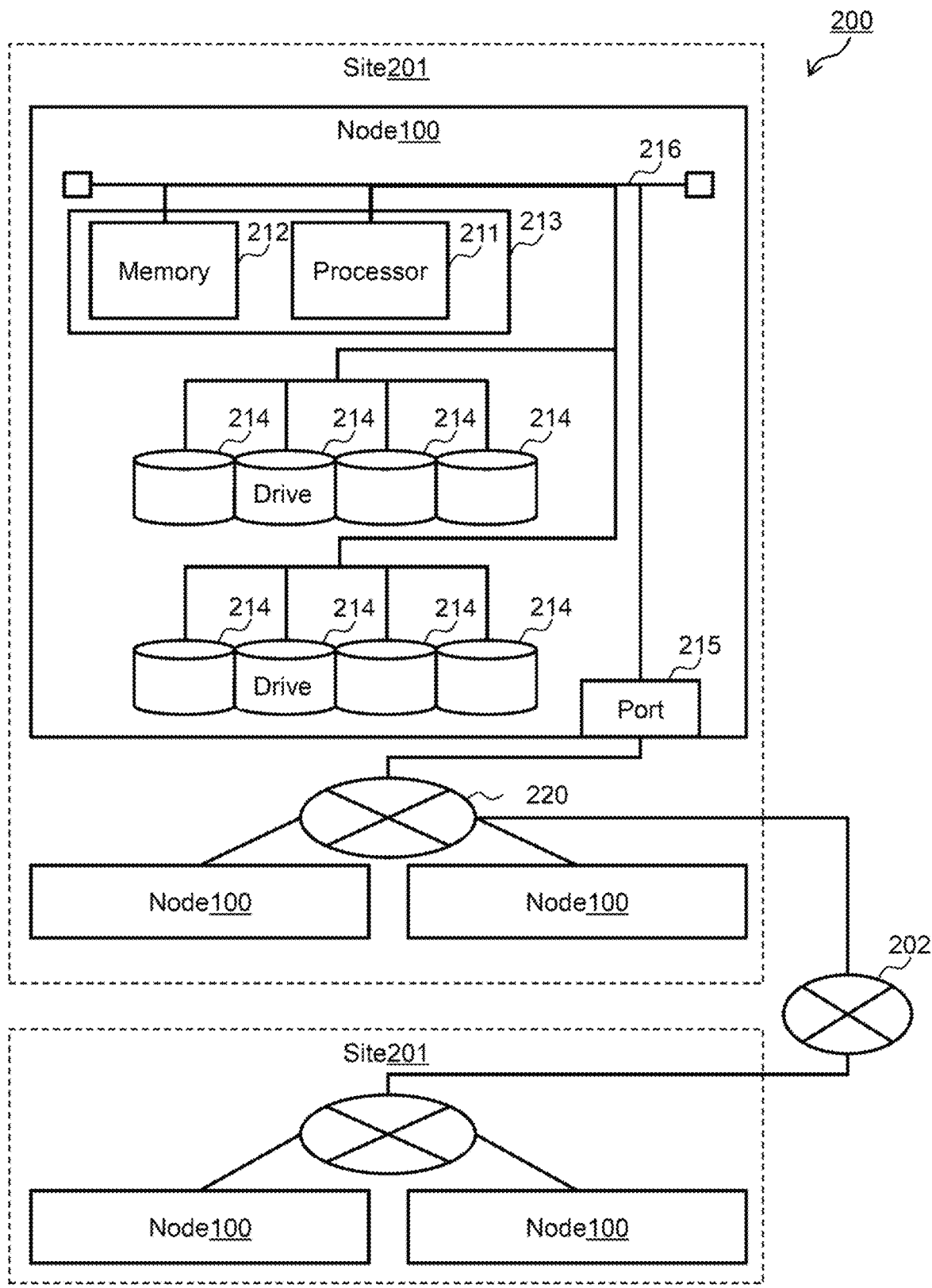
FIG. 2 is a diagram illustrating an example of a physical configuration related to a storage system according to the first embodiment.

Hereinafter, embodiments of the present invention will be described in detail. However, the present invention is not limited to the embodiments.

In a storage system according to the present embodiment, an area of a volume is divided into a plurality of areas referred to as slice areas, the area is allocated to a plurality of server computers in units of slices, and an access load to the volume is monitored. In this storage system, a load mainly occurs in a server computer to which the slices are allocated, and when the access load is low, and thus one server computer can provide the performance required by the volume, allocation is controlled so that the slices constituting the volume can be aggregated into the one server computer. In addition, in the storage system, when the access load is high and, thus, one server computer cannot provide the performance required by the volume, allocation is controlled so that the slices constituting the volume are distributed and allocated to a plurality of the server computers. In addition, in the storage system, when the host accesses the volume data, each server computer determines which server computer the slice of the access destination is allocated to, so that the load at the time of access is not allowed to be biased to a specific server computer.

Accordingly, when the access load of the volume is satisfied by one server computer, the data in the local storage can always be accessed, so that it is possible to respond to the host at a high speed. In addition, when the access load of the volume is not satisfied by one server computer, high throughput (IOPS: Input/Output Per Seconds) can be provided to the host by processing the access by the plurality of server computers. In addition, since the control is automatically performed by the storage system without the user being aware of the control, the user can achieve the above-mentioned benefits with the same operational load as the storage system described in Patent Document 1.

According to the storage system, by scaling out the capacity and performance of one volume according to the addition of the server computer, the response time and throughput can be automatically changed to the appropriate state according to the access load of the volume.

Next, embodiments of the present invention will be described with reference to the drawings. The following description and drawings are examples for explaining the present invention and are appropriately omitted and simplified for the of clarification of description. The present invention can also be implemented in various other forms. Unless otherwise specified, each component may be singular or plural.

It is noted that, in the following description, when the same type of elements are not distinguished in the description, common portions (portions excluding branch numerals) of the reference numerals including the branch numerals are used, and when the same type of elements are distinguished in the description, reference numerals including the branch numerals may be used. For example, when the physical areas are not particularly distinguished in the description, the physical areas are described as a "physical area 121", and when individual physical areas are distinguished in the description, the physical areas may be described as a "physical area 121-1" and a "physical area 121-2".

The notations such as "first", "second", "third", and the like in the present specification are attached to identify the components and do not necessarily limit the number or order. In addition, the numbers for identifying the components are used for each context, and the numbers used in one context do not always indicate the same composition in the other contexts. In addition, it is not prevented that the component identified by a certain number has a function of the component identified by another number.

FIG. 1 is an image diagram illustrating an outline of allocation change of a data of a volume in a storage system. A case where a configuration is changed from a storage system 110 to a storage system 120 will be described as an example.

In the storage system 110, a volume 102 is connected to a host 101, and data 105A, 105B, and 105C in the volume 102 are allocated to a storage pool 103A in a node 100A. The node 100A monitors the access load to the data 105 allocated to the volume 102. As a result of the monitoring, when it is detected that a load exceeds the performance that can be provided by the node 100A, the storage system 110 migrates the data 105B and 105C of the volume 102 to nodes 100B and 100C and distributes the load, and the storage system 110 transitions to the state of the storage system 120. By this control, when the load of the volume 102 is high, the process is distributed to a large number of nodes 100, so that it is possible to provide high performance for the single volume 102.

In the storage system 120, the volume 102 is connected to the host 101. The data 105A in the volume 102 is allocated to the storage pool 103A in the node 100A. The data 105B is allocated to a storage pool 103B in the node 100B. The data 105C is allocated to a storage pool 103C in the node 100C. The nodes 100A, 100B, and 100C monitor the access load to the data 105A, 105B, and 105C allocated to the volume 102. As a result of the monitoring, when it is detected that the access load of each data 105 is a load that does not exceed the performance that can be provided by the node 100A, the storage system 120 migrates the data 105B and 105C of the volume 102 to the node 100A and aggregates the load, and the storage system 120 transitions to the state of the storage system 110. By this control, when the load of the volume 102 is low, the process is aggregated by the single node 100 to improve the utilization efficiency of the network, so that it is possible to provide high performance for the entire storage system.

FIG. 2 is a diagram illustrating an example of a physical configuration related to the storage system 200.

The storage system 200 may be provided with one or more sites 201. Each site 201 is communicably connected via a network 202. The network 202 is, for example, a wide area network (WAN), but the network 202 is not limited to the WAN.

The site 201 is a data center or the like and includes one or more nodes 100.

The node 100 may have a configuration of a general server computer. The node 100 is configured to include, for example, one or more processor packages 213 including a processor 211, a memory 212, and the like, one or more drives 214, and one or more ports 215. Each component is connected via an internal bus 216.

The processor 211 is, for example, a central process unit (CPU) and performs various processes.

The memory 212 stores information for control necessary for implementing functions of the node 100 and stores data. In addition, the memory 212 stores, for example, programs executed by the processor 211. The memory 212 may be a volatile dynamic random access memory (DRAM), a non-volatile storage class memory (SCM), or another storage device.

The drive 214 stores various data, programs, and the like. The drive 214 may be a hard disk drive (HDD) or a solid state drive (SSD) connected in a serial attached SCSI (SAS) or serial advanced technology attachment (SATA) manner, an SSD connected in a non-volatile memory express (NVMe) manner, SCM or the like and is an example of the storage device.

The port 215 is connected to the network 220 and is communicably connected to other nodes 100 within the site 201. The network 220 is, for example, a local area network (LAN), but the network 220 is not limited to the LAN.

The physical configuration of the storage system 200 is not limited to the above-described contents. For example, the networks 220 and 202 may be redundantized. In addition, for example, the network 220 may be separated into a management network and a storage network, a connection standard may be Ethernet (registered trademark), Infiniband, or wireless, and a connection topology is not limited to the configuration illustrated in FIG. 2.

The host 101 may have the same components as the node 100, and thus, the description of the physical configuration of the host 101 will be omitted.

Figure 3:
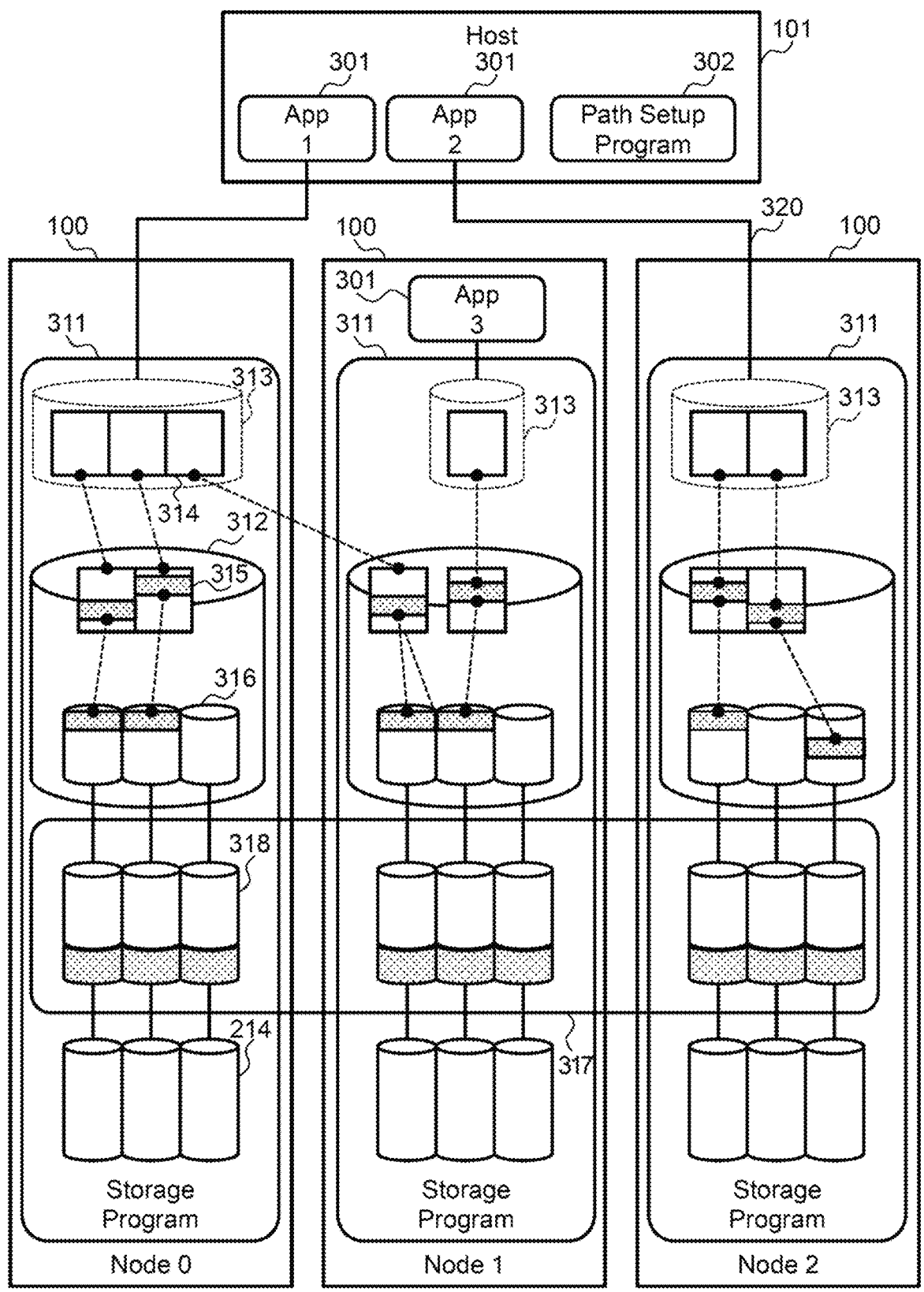
FIG. 3 is a diagram illustrating an example of a logical configuration related to the storage system according to the first embodiment.

FIG. 3 is a diagram illustrating an example of a logical configuration related to the storage system 200. In the storage system 200, storage virtualization is performed, and a plurality of physical areas are virtually integrated and used as a storage pool 312. In addition, in the storage system 200, only the capacity currently used by each host 101 is allocated by thin provisioning.

More specifically, as illustrated in FIG. 3, the drive 214 has a data storage area which is a physical area that stores data, parities, and the like. A logical drive 318, which is an area of all or a portion of the data storage area and is a continuous area, forms a parity group 317 by combining a plurality of the logical drives 318 straddling the nodes 100.

The parity group 317 is configured with the logical drives 318 of the drives 214 of a plurality of the nodes 100. For example, when a data protection policy is 2D1P, the parity group 317 is configured with three logical drives 318 secured from the drives 214 of different nodes 100.

Herein, as the data protection policy, for example, there is EC (Erasure Coding). It is noted that, as the EC, there are a first method in which data locality is not retained and a second method (for example, the method disclosed in International Publication No. 2016/52665) in which data locality is retained, and any method thereof can be applied to the storage system 200. It is noted that, in the embodiment, a case in which the second method is applied will be mainly described as an example.

Additionally speaking, for example, in the EC of the 2D1P of the first method, a data of a write request is divided into a first data and a second data, the first data is stored in the first node 100, the second data is stored in a second node 100, and a parity calculated based on the first data and the second data is stored in a third node 100, so that redundantized is performed. In addition, for example, in the EC of the 2D1P of the second method, the data of the write request is divided into the first data and the second data, the first data and the second data are stored in the first node 100 (own node 100), the parity of the first data is stored in the second node 100, and the parity of the second data is stored in the third node 100, so that redundantized is performed.

A pool volume 316 is cut out from the parity group 317. The pool volume 316 is a unit for allocating capacity to the storage pool 312 of each node 100. One pool volume 316 may be cut out from one parity group 317, or a plurality of pool volumes 316 may be cut out from one parity group 317.

Additionally speaking, for example, when the data protection policy is 2D1P, the pool volume that can be used as the data storage area is ⅔ of the total amount of the logical drives 318 allocated to the parity group 317, and the pool volume that can be used as the parity storage area is ⅓ of the total amount of logical drives 318 allocated to the parity group 317. That is, the maximum capacity that can be cut out as the pool volume 316 differs depending on the data protection policy.

The cut out pool volume 316 is attached to the storage pool 312. The storage pool 312 is configured to include one or more pool volumes 316. A virtual volume 313 used by an application 301 is cut out from the storage pool 312. That is, the storage program 311 does not allocate the capacity according to the user's request to the drive 214 but allocates the capacity as the virtual volume 313.

When the virtual volume 313 is cut out from the storage pool 312, the areas of the virtual volume 313 are partially cut out as slices 314 from the plurality of storage pools 312, and the virtual volume 313 is constructed by bundling the slices 314. The slice 314 is an area that is virtually allocated to the storage pool 312, and no physical area is allocated to the slice 314 when the virtual volume 313 is generated. One or more pages 315 are allocated to the slice 314. For example, when the storage program 311 receives the write request from the application 301, in case of new write, the storage program 311 allocates the page 315 (more specifically, the physical area of the logical drive 318 associated with the page 315) to the slice 314 of the virtual volume 313. It is noted that the page 315 is associated with the page of the pool volume 316. In case of the write of the update, the storage program 311 specifies the physical area of the logical drive 318 associated with the allocated page 315 and updates the data. It is noted that the data of the write request (or intermediate data described later) is transferred to another node 100 related to data redundantization, and the parity is updated.

The virtual volume 313 and the application 301 are connected to each other by a front-end path 320 (hereinafter, also simply referred to as a path). The connection and setting of the front-end path 320 are controlled by the storage program 311 and a path setup program 302 operating on the host 101. It is noted that, FIG. 3 illustrates an example where, after the slice 314 is migrated from the first node 100 "Node 0" to the second node 100 "Node 1", the front-end path 320 is not set to the second node 100 "Node 1" as the migration destination (allocation destination). In this case, the IO command is once transferred to the second node 100 "Node 1" as the allocation destination of the slice 314 via the first node 100 "Node 0" and processed. However, as will be described later, it is preferable that the front-end path 320 is set in the second node 100 "Node 1" as the migration destination, and optimization is performed.

In this manner, the storage program 311 manages the drive 214 as the shared storage pool 312 and allocates the capacity to the drive 214 according to the amount of data written to the virtual volume 313. Accordingly, efficient operation is performed without wasting the unused drive 214.

In the following, in the updating of the data, the configuration in which the data is stored in the drive 214 (local drive) of the node 100 that receives the write request (configuration in which the data locality is maintained and the network overhead is eliminated at the time of reading) will be mainly described as an example.

It is noted that the application 301 that accesses the data may be provided to operate on the host 101, may be provided to operate on the same node 100 together with the storage program 311, or may be provided to operate on another node 100.

Figure 4:
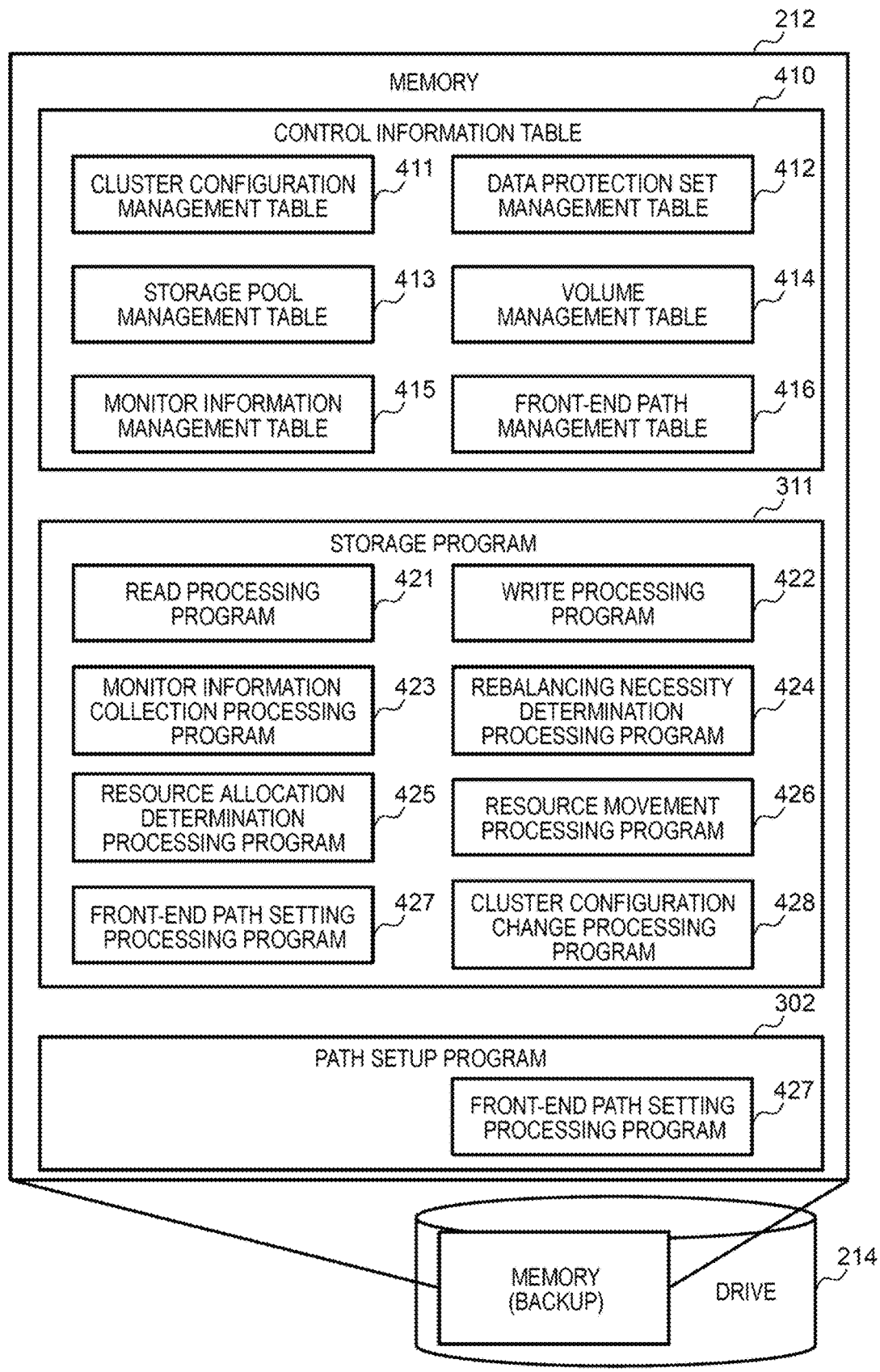
FIG. 4 is a diagram illustrating an example of information in a memory according to the first embodiment.

FIG. 4 is a diagram illustrating an example of information (information read from the drive 214 to the memory 212) in the memory 212. It is noted that a control information table 410 and various programs (storage program 311 and the like) are loaded on the memory 212 during the execution, and the control information table 410 and various programs are stored in a non-volatile area in the drive 214 in preparation for power failure or the like.

The control information table 410 is configured to include a cluster configuration management table 411, a data protection set management table 412, a storage pool management table 413, a volume management table 414, a monitor information management table 415, and a front-end path management table 416. These tables will be described later with reference to FIGS. 5 to 10.

The storage program 311 is configured to include a read processing program 421, a write processing program 422, a monitor information collection processing program 423, a rebalancing necessity determination processing program 424, a resource allocation determination processing program 425, a resource migration processing program 426, a front-end path setup processing program 427, and a cluster configuration change processing program 428. It is noted that the path setup program 302 is configured to include the front-end path setup processing program 427.

Functions (the read processing program 421, the write processing program 422, the monitor information collection processing program 423, the rebalancing necessity determination processing program 424, the resource allocation determination processing program 425, the resource migration processing program 426, the front-end path setup processing program 427 of the storage program 311, the cluster configuration change processing program 428, and the like) of the node 100 may be implemented, for example, by allowing the processor 211 to read the program stored in the drive 214 into the memory 212 (software), may be implemented by hardware such as dedicated circuits, or may be implemented by combining software and hardware. In addition, a portion of the function of the node 100 may be implemented by another computer capable of communicating with the node 100.

The functions (for example, the front-end path setup processing program 427 of the path setup program 302) of the host 101 may be implemented, for example, by allowing the processor 211 to read the program stored in the drive 214 into the memory 212 (software), may be implemented by hardware such as dedicated circuits, or may be implemented by combining software and hardware. In addition, a portion of the functions of the host 101 may be implemented by another computer capable of communicating with the host 101.

Figure 5:
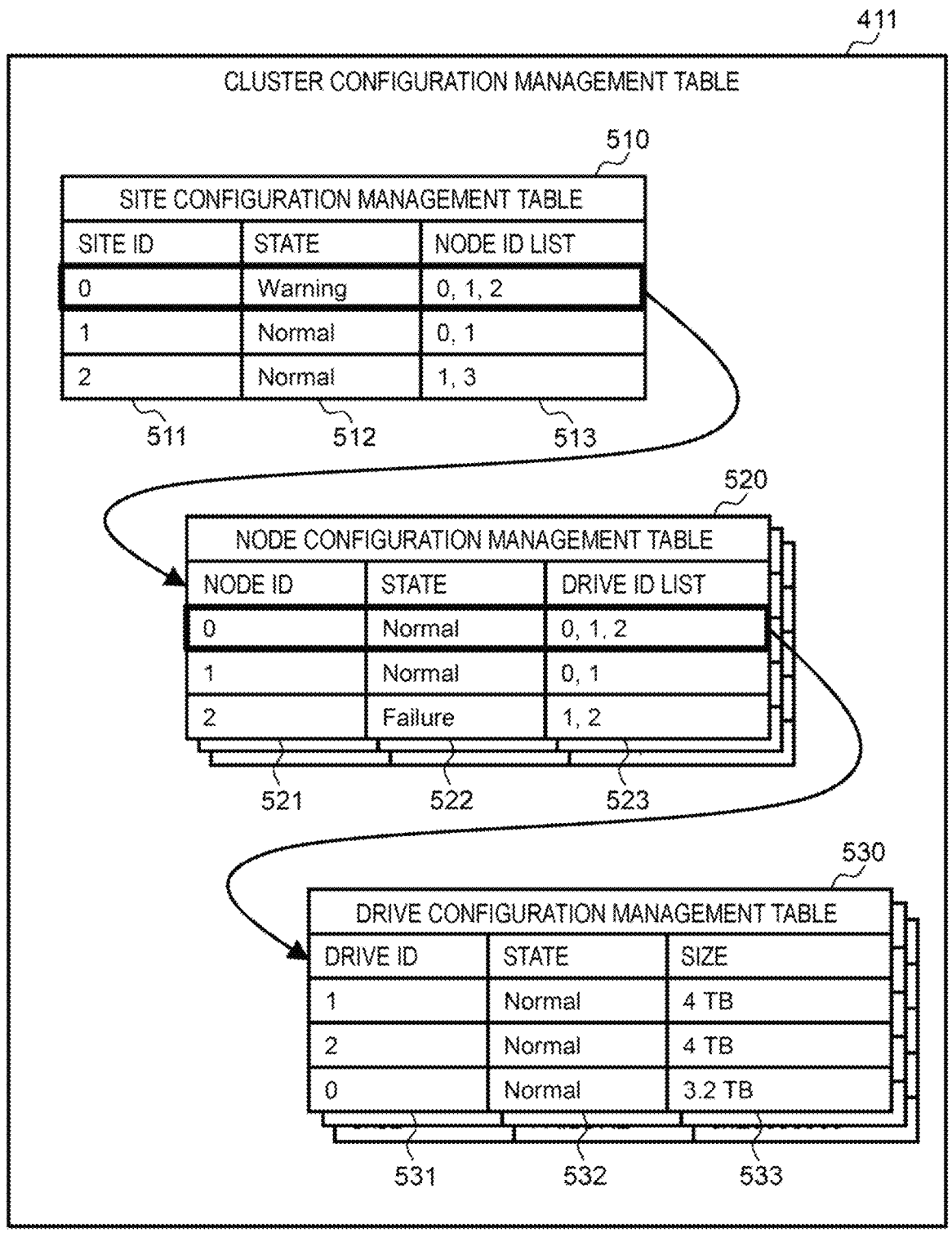
FIG. 5 is a diagram illustrating an example of a cluster management table according to the first embodiment.

FIG. 5 is a diagram illustrating an example of the cluster configuration management table 411.

The cluster configuration management table 411 stores information for managing the configurations of the site 201, the node 100, and the drive 214.

The cluster configuration management table 411 includes a site configuration management table 510, anode configuration management table 520, and a drive configuration management table 530. It is noted that the storage system 200 manages the site configuration management table 510, the site 201 manages a plurality of node configuration management tables 520 in the site 201, and the node 100 manages a plurality of the drive configuration management tables 530 in the node 100.

The site configuration management table 510 stores information indicating the configuration (relationship between the site 201 and the node 100, or the like) related to the site 201. More specifically, the site configuration management table 510 stores information in which a site ID 511, a state 512, and a node ID list 513 are associated with each other.

The site ID 511 is identification information with which the site 201 can be identified. The state 512 is state information (NORMAL, WARNING, FAILURE, or the like) indicating the state of the site 201. The node ID list 513 is a list of identification information with which the node 100 provided at the site 201 can be identified.

The node configuration management table 520 is provided for each site 201 and stores information indicating the configuration (relationship between the node 100 and the drive 214 or the like) related to the node 100 provided at the site 201. More specifically, the node configuration management table 520 stores information in which the node ID 521, the state 522, and the drive ID list 523 are associated with each other.

The node ID 521 is identification information with which the node 100 can be identified. The state 522 is state information (NORMAL, WARNING, FAILURE, or the like) indicating the state of the node 100. The drive ID list 523 is a list of identification information with which the drive 214 provided in the node 100 can be identified.

The drive configuration management table 530 is provided for each node 100 and stores information indicating a configuration related to the drive 214 provided in the node 100. More specifically, the drive configuration management table 530 stores information in which a drive ID 531, a state 532, and a size 533 are associated with each other.

The drive ID 531 is identification information with which the drive 214 can be identified. The state 532 is state information (NORMAL, WARNING, FAILURE, or the like) indicating the state of the drive 214. The size 533 is information (TB (terabyte), GB (gigabyte), or the like) indicating the capacity of the drive 214.

FIG. 6 is a diagram illustrating an example of the data protection set management table 412.

The data protection set management table 412 stores control information for managing the configuration of the parity group 317 configured by combining the logical drives 318.

The data protection set management table 412 is configured to include a pool volume management table 610, a parity group management table 620, a logical drive management table 630, and a stripe mapping table 640.

The pool volume management table 610 stores information related to the pool volume 316 cut out from the parity group 317. More specifically, the pool volume management table 610 stores information in which a pool volume ID 611, a size 612, a parity group ID 613, and a logical drive ID 614 are associated with each other.

The pool volume ID 611 is identification information with which the pool volume 316 cut out from the parity group 317 can be identified. The size 612 is information (TB (terabyte), GB (gigabyte), or the like) indicating the capacity of the pool volume 316. The parity group ID 613 is identification information with which the parity group 317 to which the pool volume 316 belongs can be identified. The logical drive ID 614 is identification information with which the logical drive 318 that provides the data area to be stored in the pool volume 316 can be identified.

The parity group management table 620 stores information related to the parity group 317. More specifically, the parity group management table 620 stores information in which a parity group ID 621, a redundancy policy 622, and a logical drive ID list 623 are associated with each other.

The parity group ID 621 is identification information with which the parity group 317 can be identified. The redundancy policy 622 is a setting related to the redundantization method of the parity group 317. The logical drive ID list 623 is a list of identification information with which the logical drive 318 allocated to the parity group 317 can be identified.

The logical drive management table 630 stores information (information for cutting out the physical area of the drive 214 by the size from the start offset and managing the physical area as the logical drive 318) related to the logical drive 318. More specifically, the logical drive management table 630 stores information in which a logical drive ID 631, a start offset 632, a size 633, and a drive ID 634 are associated with each other.

The logical drive ID 631 is identification information with which the logical drive 318 can be identified. The start offset 632 is information indicating a start position when the logical drive 318 is cut out from the drive 214. The size 633 is information (number of blocks) indicating the capacity of the logical drive 318. Herein, the block denotes an access unit to the drive 214, and typically, the size of one block is 512 bytes. However, the size of the block is not limited to 512 Bytes, but the size may be 4 KB, 8 KB, or the like. The drive ID 634 is identification information (information indicating from which drive 214 the logical drive 318 is cut out) with which the storage resource from which the logical drive 318 is cut out can be identified.

The stripe mapping table 640 stores information (information for calculating the storage destination address of the data and the parity) related to the parity group 317. As an example, a case where the stripe mapping table 640 stores the information of the stripe mapping table 641 of the EC (2D1P) and the stripe mapping table 642 of the mirror (2-Replication) will be described. The 2D1P denotes that one parity is calculated by combining two data and the data is protected.

The stripe mapping tables 641 and 642 are used to specify a physical LBA (redundantization destination node) of the parity area with respect to a physical LBA (Logical Block Address) of a certain data area.

The stripe mapping tables 641 and 642 are stored in a format of a table, an array, or the like and retain information corresponding to a node ID as an element on the horizontal axis and information corresponding to an address as an element on the vertical axis. The information on the horizontal axis may directly store the information on the node ID or may be managed via another table that associates the ID on the horizontal axis with the node ID in the stripe mapping tables 641 and 642. The information on the vertical axis does not need to directly store the information on the LBA, and for example, the LBA can be converted to the ID on the vertical axis as follows.

RowID=LBA mod Rowmax (Rowmax is "6" in the stripe mapping tables 641 and 642)

FIG. 7 is a diagram illustrating an example of the storage pool management table 413.

The storage pool management table 413 stores control information for managing the configuration of the storage pool 312. The storage pool management table 413 is configured to include a storage pool information table 710.

The storage pool information table 710 stores information related to the storage pool 312. More specifically, the storage pool information table 710 stores information in which a storage pool ID 711, a total capacity 712, a used capacity 713, a node ID 714, and a pool volume ID list 715 are associated with each other.

The storage pool ID 711 is identification information with which the storage pool 312 can be identified. The total capacity 712 is information (TB (terabyte), GB (gigabyte), or the like) indicating the total capacity allocated to the storage pool 312. The used capacity 713 is information (TB (terabyte), GB (gigabyte), or the like) indicating the capacity used in the storage pool 312. The node ID 714 is identification information with which the node 100 that provides the storage pool 312 can be identified. The pool volume ID list 715 is a list of identification information with which the pool volume 316 allocated to the storage pool 312 can be identified.

FIG. 8 is a diagram illustrating an example of the volume management table 414.

The volume management table 414 stores the configuration information of the virtual volume 313, the configuration information of the slice 314 allocated between the nodes 100, and the control information for the thin provisioning function.

The volume management table 414 is configured to include a virtual volume management table 810, a slice management table 820, and a page mapping table 830.

The virtual volume management table 810 stores information (information indicating the correspondence between the virtual volume 313 and the slice 314 allocated to the virtual volume 313, or the like) related to the virtual volume 313. More specifically, the virtual volume management table 810 stores information in which a virtual volume ID 811, a size 812, a slice ID list 813, and a maximum distribution degree 814 are associated with each other.

The virtual volume ID 811 is identification information with which the virtual volume 313 can be identified. The size 812 is information (TB (terabyte), GB (gigabyte), or the like) indicating the capacity of the virtual volume 313. The slice ID list 813 is a list of identification information with which the slice 314 allocated to the virtual volume 313 can be identified. The maximum distribution degree 814 is the maximum value of the number of nodes for distributing the slice 314 allocated to the virtual volume 313. The number of nodes 100 exceeding the maximum distribution degree 814 is controlled so that the slice 314 is not allocated.

The slice management table 820 stores information (information indicating the correspondence between the slice 314 and the storage pool 312 corresponding to the slice 314, or the like) related to the slice 314 allocated to the virtual volume 313. More specifically, the slice management table 820 stores information in which a slice ID 821, a size 822, a storage pool ID 823, and a state 824 are associated with each other.

The slice ID 821 is identification information with which the slice 314 can be identified. The size 822 is information indicating the capacity of the slice 314 (TB (terabyte), GB (gigabyte), number of logical blocks, or the like). The storage pool ID 823 is identification information with which the storage pool 312 corresponding to the slice 314 can be identified. When the slice 314 is being migrated between the two storage pools 312, the storage pool ID 823 stores identification information with which the storage pools 312 before and after the migration can be identified. The state 824 is information indicating the state of the slice 314. The state 824 includes a normal state (Normal), a failure state (Failure), and a state of migrating between two storage pools 312 (Migrating).

The page mapping table 830 stores information (information indicating the correspondence between the page 315 and the pool volume 316, or the like) related to the page 315 allocated to the virtual volume 313. More specifically, the page mapping table 830 stores information in which a page ID 831, a virtual volume ID 832, a virtual volume LBA 833, a size 834, a pool volume ID 835, and a pool volume LBA 836 are associated with each other.

The page ID 831 is identification information with which the page 315 can be identified. The virtual volume ID 832 is identification information with which the virtual volume 313 to which the page 315 is allocated can be identified. The virtual volume LBA 833 is information that can specify the position of the page 315 in the virtual volume 313 and is, for example, information indicating the number from the first page 315 of the virtual volume 313. It is noted that the page 315 is a unit for the storage program 311 to access the virtual volume 313. The size 834 is information indicating the capacity of the page 315 (TB (terabyte), GB (gigabyte), number of logical blocks, or the like). The pool volume ID 835 is identification information with which the pool volume 316 corresponding to the page 315 can be identified. The pool volume LBA 836 is information that can specify the position of the pool volume 316 in the storage pool 312 and is, for example, information indicating the number from the first pool volume 316 of the storage pool 312.

The size 834 may be the same for all the pages 315 or may be different among the pages 315.

Additionally speaking, the storage program 311 refers to the page mapping table 830 when translating from the address of the virtual volume 313 to the address of the storage pool 312. In addition, the storage program 311 allocates the page 315 (adds a record to the page mapping table 830) when a new write is received.

FIG. 9 is a diagram illustrating an example of the monitor information management table 415.

The monitor information management table 415 stores control information for managing a usage amount of the processor 211, the drive 214, and the port 215 of the process operating on the node 100 and an access frequency to the slice 314 of the virtual volume 313 and the front-end path 320.

The monitor information management table 415 is configured to include a processor monitor information management table 910, a drive monitor information management table 920, a network monitor information management table 930, a slice monitor information management table 940, and a front-end path monitor information management table 950.

The processor monitor information management table 910 stores information (information indicating the relationship between the process and the usage amount of the processor 211) related to the processor 211. More specifically, the processor monitor information management table 910 stores information in which a node ID 911, a processor ID 912, a process ID 913, a process name 914, and a usage rate 915 are associated with each other.

The node ID 911 is identification information with which the node 100 can be identified. The processor ID 912 is identification information with which the processor core can be identified when a plurality of the processor cores are mounted in the node 100. The process ID 913 is identification information with which the program operating on the node 100 can be identified. The process name 914 is character string information with which the program operating on the node 100 can be identified. The usage rate 915 represents the occupancy rate of the processor core in which the program operating in the node 100 operates. For example, when the usage rate of the storage program 311 is 50%, it denotes that the storage program 311 occupies a half of the operating frequency of the processor core in which the storage program 311 operates.

The drive monitor information management table 920 stores information (information indicating the relationship of the usage amount of the drive 214) related to the drive 214. More specifically, the drive monitor information management table 920 stores information in which a drive ID 921, a read IOPS 922, a write IOPS 923, a read transfer amount 924, a write transfer amount 925, and a usage rate 926 are associated with each other.

The drive ID 921 is identification information with which the drive 214 can be identified. The read IOPS 922 is the number of processes per second of the read command for the drive 214. The write IOPS 923 is the number of processes per second of the write command for the drive 214. The read transfer amount 924 is a data transfer amount per second of the read command for the drive 214. The write transfer amount 925 is a data transfer amount per second of the write command for the drive 214. The usage rate 926 indicates a load degree of the drive 214, and when the usage rate reaches 100%, the drive 214 cannot process the I/O any more, and the I/O request received by the drive 214 is awaited.

The network monitor information management table 930 stores information (information indicating the relationship of the usage amount of the port 215) related to the port 215 connected to the network 220. More specifically, the network monitor information management table 930 stores information in which a node ID 931, an NIC (Network Interface Card) ID 932, a transmission transfer amount 933, a reception transfer amount 934, and a maximum transfer amount 935 are associated with each other.

The node ID 931 is identification information with which the node 100 can be identified. The NIC ID 932 is identification information with which the NIC can be identified when a plurality of the NICs (ports 215) are mounted in the node 100. It is noted that, in the present embodiment, a case where the NIC includes one port 215 will be described as an example. The transmission transfer amount 933 is a transfer amount per second of a transmission process for the NIC.

The reception transfer amount 934 is a transfer amount per second of a reception process for the NIC. The maximum transfer amount 935 is a maximum transfer amount per second of transmission and reception that can be processed by the NIC.

The slice monitor information management table 940 stores information on the access frequency to the slice 314. More specifically, information in which a slice ID 941, a read counter 942, a write counter 943, a read transfer amount 944, a write transfer amount 945, and a monitor start time 946 are associated with each other is stored in the slice monitor information management table 940.

The slice ID 941 is identification information with which the slice 314 can be identified. The read counter 942 is information for managing the number of times of reading of the slice 314. The write counter 943 is information for managing the number of times of writing the slice 314. The read transfer amount 944 is information for managing a transfer amount of reading the slice 314. The write transfer amount 945 is information for managing a transfer amount of writing the slice 314. The monitor start time 946 is information indicating the time when the monitoring of access to the slice 314 is started.

The front-end path monitor information management table 950 stores information on the access frequency to the front-end path 320. More specifically, the front-end path monitor information management table 950 stores information in which a path ID 951, a read TOPS 952, a write TOPS 953, a read transfer amount 954, and a write transfer amount 955 are associated with each other.

The path ID 951 is identification information with which the front-end path 320 can be identified. The read TOPS 952 is the number of processes per second of the read command for the front-end path 320. The write TOPS 953 is the number of processes per second of the write command for the front-end path 320. The read transfer amount 954 is a data transfer amount per second of the read command for the front-end path 320. The write transfer amount 955 is a data transfer amount per second of the write command for the front-end path 320.

FIG. 10 is a diagram illustrating an example of the front-end path management table 416.

The front-end path management table 416 stores control information for managing the configuration of the front-end path 320. The front-end path management table 416 is configured to include a front-end path information table 1010.

The front-end path information table 1010 stores information related to the front-end path 320. More specifically, the front-end path information table 1010 stores information in which a path ID 1011, a virtual volume ID 1012, an initiator ID 1013, an ALUA setting 1014, and a connection node ID 1015 are associated with each other.

The path ID 1011 is identification information with which the front-end path 320 can be identified. The virtual volume ID 1012 is identification information with which the virtual volume 313 to which the front-end path 320 is allocated can be identified. The Initial ID 1013 is identification information with which the host 101 that is a connection destination of the front-end path 320 can be identified. The ALUA setting 1014 is information indicating setting as to whether or not the corresponding front-end path 320 is suitable for the storage system 200. The host 101 is notified of the information based on the ALUA setting 1014, and thus, the host 101 can issue an I/O request to a suitable path, so that the process efficiency of the storage system 200 can be improved. The connection node ID 1015 is identification information with which the node ID having the front-end path 320 can be identified.

Figure 11:
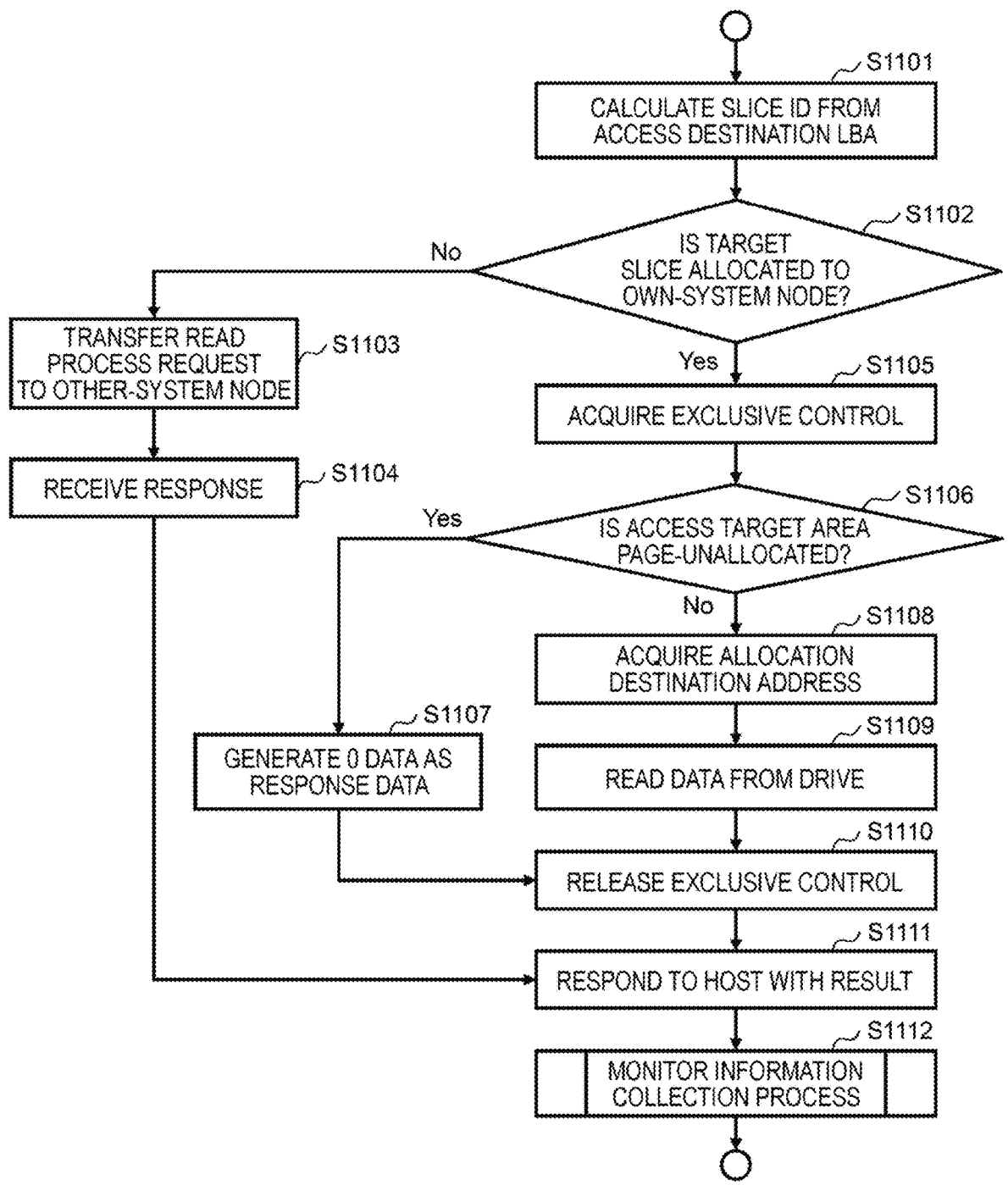
FIG. 11 is a diagram illustrating an example of a flowchart related to a read process according to the first embodiment.

FIG. 11 is a diagram illustrating an example of a flowchart related to the read process. In the read process, the data is read from the drive 214 of the own node 100 in response to the data read process request from the application 301. It is noted that, in the read process request, a read destination (for example, a virtual volume ID such as a logical unit number (LUN), an address such as LBA, or the like) is designated. When the access destination (drive 214 or the like) is in a failure state, the data that is the read target is restored from a redundant data, and responding is performed. The details will be described below.

In step S1101, the read processing program 421 calculates the slice ID from the access destination LBA. More specifically, the read processing program 421 acquires the slice ID corresponding to the LBA of the access destination by tracing the list in order when the LBA of the virtual volume 313 is continuously allocated from the first slice of the slice ID list 813 by referring to the virtual volume management table 810.

In step S1102, the read processing program 421 determines whether or not the slice ID (target slice) acquired in step S1101 is allocated to the own node 100 (own-system node). More specifically, the read processing program 421 acquires the storage pool ID corresponding to the slice ID by referring to the slice management table 820. Next, the read processing program 421 acquires the node ID corresponding to the acquired storage pool ID by referring to the storage pool information table 710. The read processing program 421 compares the acquired node ID with the node ID of the own-system node, and when the acquired node ID and the node ID of the own-system node are the same node ID, the read processing program 421 determines that the target slice (slice 314 of the access destination) is allocated to the own-system node. When the acquired node ID and the node ID of the own-system node are different node IDs, the read processing program 421 determines that the target slice is allocated to the other node 100 (other-system node). When it is determined that the target slice is allocated to the own-system node, the read processing program 421 shifts the process to step S1105, and when it is determined that the target slice is not allocated to the own-system node, the read processing program 421 shifts the process to step S1103.

In step S1103, the read processing program 421 transfers the read process request to the other-system node to which the target slice is allocated.

In step S1104, the read processing program 421 waits for the execution result of the read process request transferred in step S1103, receives the execution result, and shifts the process to step S1111.

In step S1105, the read processing program 421 acquires the exclusive control regarding the area of the access destination.

In step S1106, the read processing program 421 determines whether or not the page 315 is unallocated to the storage pool 312 with respect to the data of the read process request. When it is determined that the page 315 is unallocated, the read processing program 421 shifts the process to step S1107, and when it is determined that the page 315 is not unallocated, the read processing program 421 shifts the process to step S1108.

In step S1107, the read processing program 421 generates 0 data indicating that there is no data and shifts the process to step S1110.

In step S1108, the read processing program 421 acquires the address (allocation destination address) of the access destination.

In step S1109, the read processing program 421 reads data from the drive 214 (local drive) of the own-system node.

In step S1110, the read processing program 421 releases the acquired exclusive control.

In step S1111, the read processing program 421 responds to the host 101 with the read process result.

In step S1112, the read processing program 421 executes the monitor information collection process. The monitor information collection process will be described later with reference to FIG. 13B.

Figure 12:
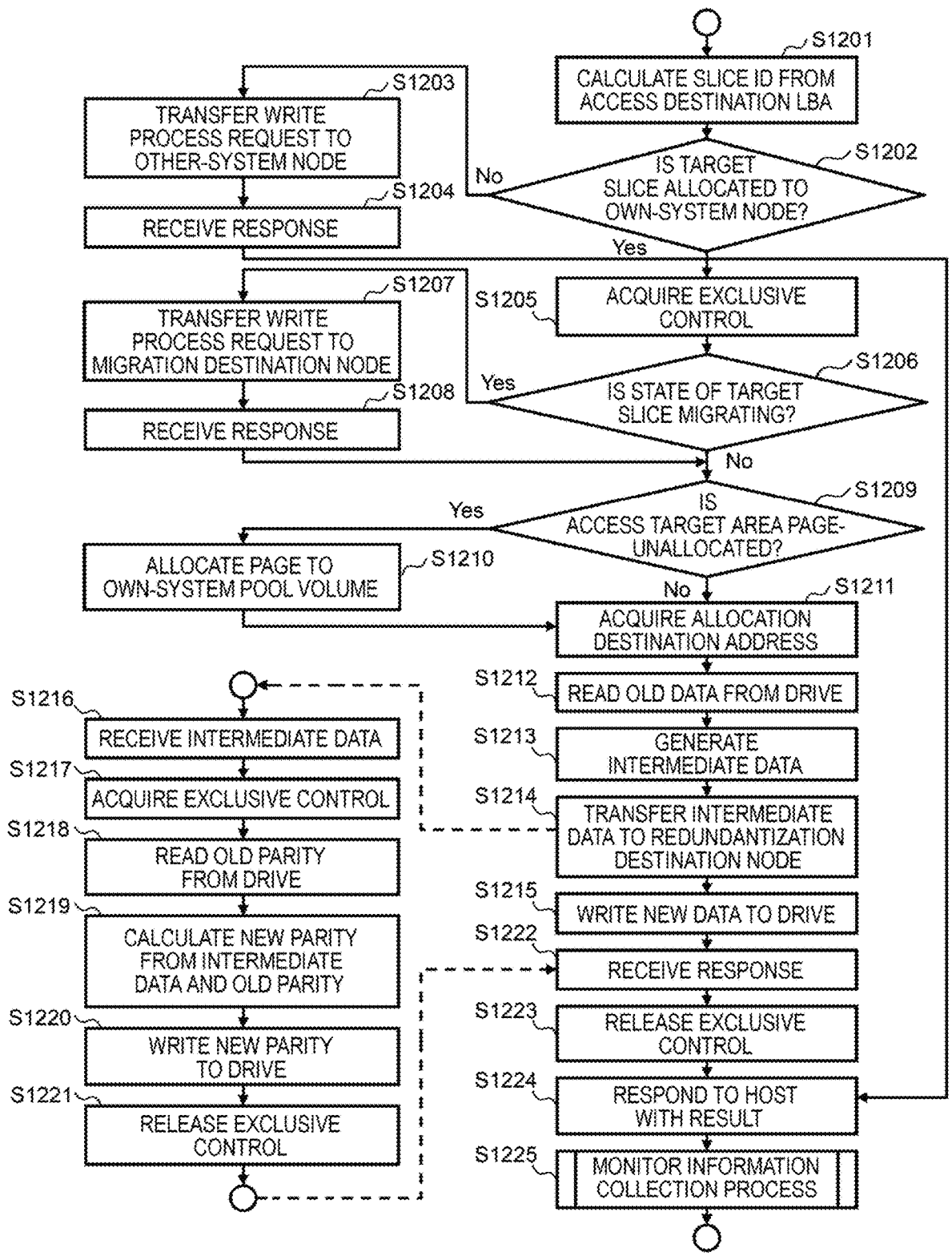
FIG. 12 is a diagram illustrating an example of a flowchart related to a write process according to the first embodiment.

FIG. 12 is a diagram illustrating an example of a flowchart related to the write process. In the write process, in response to the write process request from the application 301, data is written to the drive 214 of the own-system node, and the redundant data (parity) is written to the drive 214 of the other-system node. In the write process request, a write destination (for example, a virtual volume ID such as LUN, an address such as LBA, or the like) is designated. The details will be described below.

In step S1201, the write processing program 422 calculates the slice ID from the access destination LBA. More specifically, the write processing program 422 acquires the slice ID corresponding to the LBA of the access destination by tracing the list in order when the LBA of the virtual volume 313 is continuously allocated from the first slice of the slice ID list 813 by referring to the virtual volume management table 810.

In step S1202, the write processing program 422 determines whether or not the slice ID (target slice) acquired in step S1201 is allocated to the own-system node. The write processing program 422 determines in the same manner as the method described in the read processing program 421. When it is determined that the target slice is allocated to the own-system node, the write processing program 422 shifts the process to step S1205, and when it is determined that the target slice is not allocated to the own-system node, the write processing program 422 shifts the process to step S1203.

In step S1203, the write processing program 422 transfers the write process request to the other-system node to which the target slice is allocated.

In step S1204, the write processing program 422 waits for the execution result of the write process request transferred in step S1203, receives the execution result, and shifts the process to step S1224.

In step S1205, the write processing program 422 acquires the exclusive control with respect to the area of the access destination.

In step S1206, the write processing program 422 determines whether or not the state of the target slice is migrating. More specifically, the write processing program 422 determines, by referring to the slice management table 820, that the state is migrating when the state corresponding to the slice ID of the slice 314 that is the access destination is "migrating" and that the state is not migrating when the state is not "migrating". When it is determined that the state of the target slice is migrating, the write processing program 422 shifts the process to step S1207, and when it is determined that the state of the target slice is not migrating, the write processing program 422 shifts the process to step S1209.

In step S1207, the write processing program 422 transfers the write process request to the node 100 (migration destination node) of the migration destination of the target slice.

In step S1208, the write processing program 422 waits for the execution result of the write process request transferred in step S1207, receives the execution result, and shifts the process to step S1209.

In step S1209, the write processing program 422 determines whether or not the page 315 is unallocated to the storage pool 312 with respect to the data of the write process request. When it is determined that the page 315 is unallocated, the write processing program 422 shifts the process to step S1210, and when it is determined that the page 315 is not unallocated, the write processing program 422 shifts the process to step S1211.

In step S1210, the write processing program 422 allocates the page 315 to the pool volume 316 (own-system pool volume) to which the logical drive 318 of the drive 214 of the own-system node is associated.

In step S1211, the write processing program 422 acquires the address (allocation destination address) of the access destination.

In step S1212, the write processing program 422 reads the data (old data) before writing. When the drive 214 or the node 100 of the read destination is in a failure state, the write processing program 422 restores the data that is the read target from the parity as described in the read processing program 421 and reads the old data.

In step S1213, the write processing program 422 generates the intermediate data. The intermediate data is a temporary data generated when the data is partially updated and is a data illustrating the difference between the old data and the new data. For example, when the stripe of the old data is "A1-A2-AP", the intermediate data is obtained as follows.

AP (old parity)=A1 (old data) XOR A2 (old data)
A1 (new data) XOR A1 (old data)=M (intermediate data)
It is noted that the new parity is obtained as follows.
AP (old parity) XOR M (intermediate data)=AP (new parity)

In step S1214, the write processing program 422 transmits the intermediate data (parity update request) to the node 100 of the redundantization destination. It is noted that the write processing program 422 transfers the intermediate data according to the redundancy (when the redundancy is 2 or more, to the node 100 having 2 or more).

In step S1215, the write processing program 422 writes a new data to the drive 214 of the own-system node.

In step S1216, the write processing program 422 of the node 100 of the redundantization destination receives the intermediate data.

In step S1217, the write processing program 422 of the node 100 of the redundantization destination acquires the exclusive control.

In step S1218, the write processing program 422 of the node 100 of the redundantization destination reads the old parity from the drive 214 of the own-system node.

In step S1219, the write processing program 422 of the node 100 of the redundantization destination calculates the new parity from the intermediate data and the old parity.

In step S1220, the write processing program 422 of the node 100 of the redundantization destination writes the new parity to the drive 214 of the own-system node.

In step S1221, the write processing program 422 of the node 100 of the redundantization destination releases the acquired exclusive control and responds with the parity update result to the node 100 that has transferred the intermediate data.

In step S1222, the write processing program 422 receives a write response from the node 100 of the redundantization destination.

In step S1223, the write processing program 422 releases the acquired exclusive control.

In step S1224, the write processing program 422 responds to the host 101 with the write process result.

In step S1225, the write processing program 422 executes the monitor information collection process. It is noted that the monitor information collection process will be described later with reference to FIG. 13B.

Figure 13A:
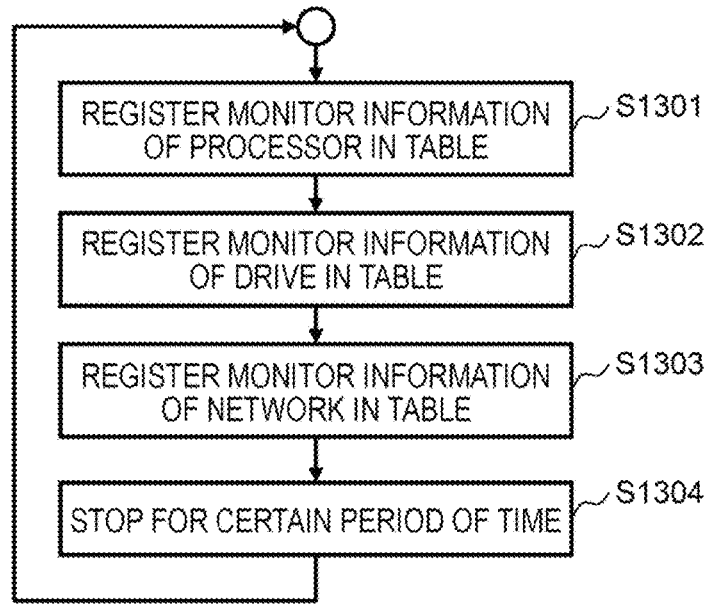
FIG. 13A is a diagram illustrating an example of a flowchart related to a monitor information collection process according to the first embodiment.

FIG. 13A is a diagram illustrating an example of a flowchart related to the monitor information collection process regarding the processor 211, the drive 214, and the network 220.

In step S1301, the monitor information collection processing program 423 registers the monitor information of the processor 211 in the table. More specifically, as illustrated in the processor monitor information management table 910, the monitor information collection processing program 423 collects the information of the usage rate of the processor for each node 100, each process, and each processor core and updates the information in the table. Although not illustrated, the information (IDLE, IOWAIT, STEAL if it is executed as a virtual machine on a hypervisor, or the like) other than the usage rate may be acquired and added to the table.

In step S1302, the monitor information collection processing program 423 registers the monitor information of the drive 214 in the table. More specifically, as illustrated in the drive monitor information management table 920, the monitor information collection processing program 423 collects the information on the read IOPS, the write IOPS, the read transfer amount, and the write transfer amount for each drive 214 and updates the information in the table. Although not illustrated, the information (read response time, write response time, queue size, or the like) other than the above-mentioned information may be acquired and added to the table.

In step S1303, the monitor information collection processing program 423 registers the monitor information of the network 220 (NIC) in the table. More specifically, as illustrated in the network monitor information management table 930, the monitor information collection processing program 423 collects the information on the transmission transfer amount, the reception transfer amount, and the maximum transfer amount for each NIC for each node 100 and updates the information in the table. Although not illustrated, the information (number of packet drops, number of retransmitted packets, or the like) other than the above-mentioned information may be acquired and added to the table.

In step S1304, the monitor information collection processing program 423 stops the process for a certain period of time and, after that, shifts the process to step S1301. That is, the monitor information collection process of FIG. 13A is periodically executed.

Figure 13B:
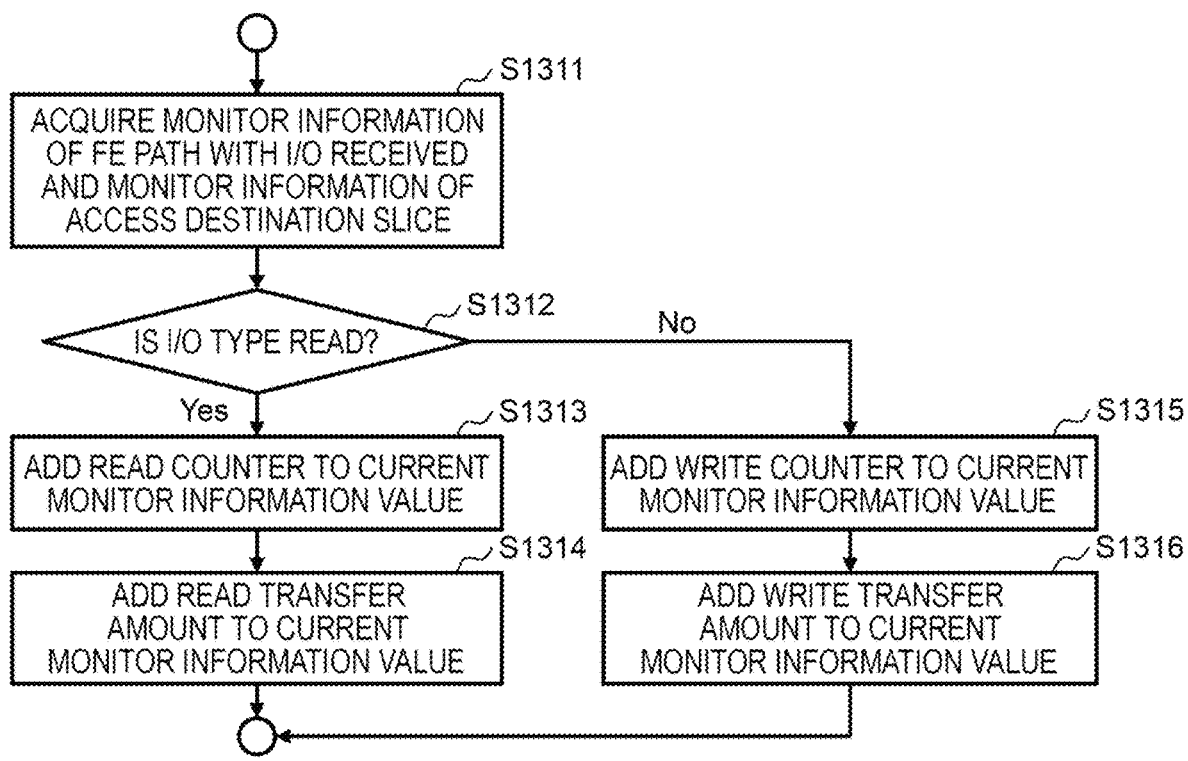
FIG. 13B is a diagram illustrating an example of a flowchart related to the monitor information collection process according to the first embodiment.

FIG. 13B is a diagram illustrating an example of a flowchart related to the monitor information collection process regarding the access frequency of the slice 314 and the access frequency of the front-end path 320.

In step S1311, the monitor information collection processing program 423 acquires the monitor information of the front-end path 320 that received the I/O and the monitor information of the slice 314 of the access destination. More specifically, the monitor information collection processing program 423 acquires a record of the front-end path monitor information management table 950 corresponding to the front-end path 320 that received the access and a record of the slice monitor information management table 940 corresponding to the slice 314 of the access destination.

In step S1312, the monitor information collection processing program 423 determines whether or not the received I/O type is a read. When it is determined that the received I/O type is a read, the monitor information collection processing program 423 shifts the process to step S1313, and when it is determined that the received I/O type is not a read (the received I/O type is a write), the monitor information collection processing program 423 shifts the process to step S1315.

In step S1313, the monitor information collection processing program 423 adds the received I/O count to the current read counter of the record acquired in step S1311. Herein, since IOPS is the process amount per second, the monitor information collection processing program 423 obtains the IOPS by determining the counter value every second, that is, by calculating the counter value generated when 1 second elapses and sets the IOPS as a read IOPS of the record acquired in step S1311.

In step S1314, the monitor information collection processing program 423 adds the received I/O transfer amount to the current read transfer amount of the record acquired in step S1311.

In step S1315, the monitor information collection processing program 423 adds the received I/O count to the current write counter of the record acquired in step S1311. In addition, the monitor information collection processing program 423 obtains the IOPS by determining the counter value every second, that is, by calculating the counter value generated when 1 second elapses and sets the IOPS as a write IOPS of the record acquired in step S1311.

In step S1316, the monitor information collection processing program 423 adds the received I/O transfer amount to the current write transfer amount of the record acquired in step S1311.

Figure 14:
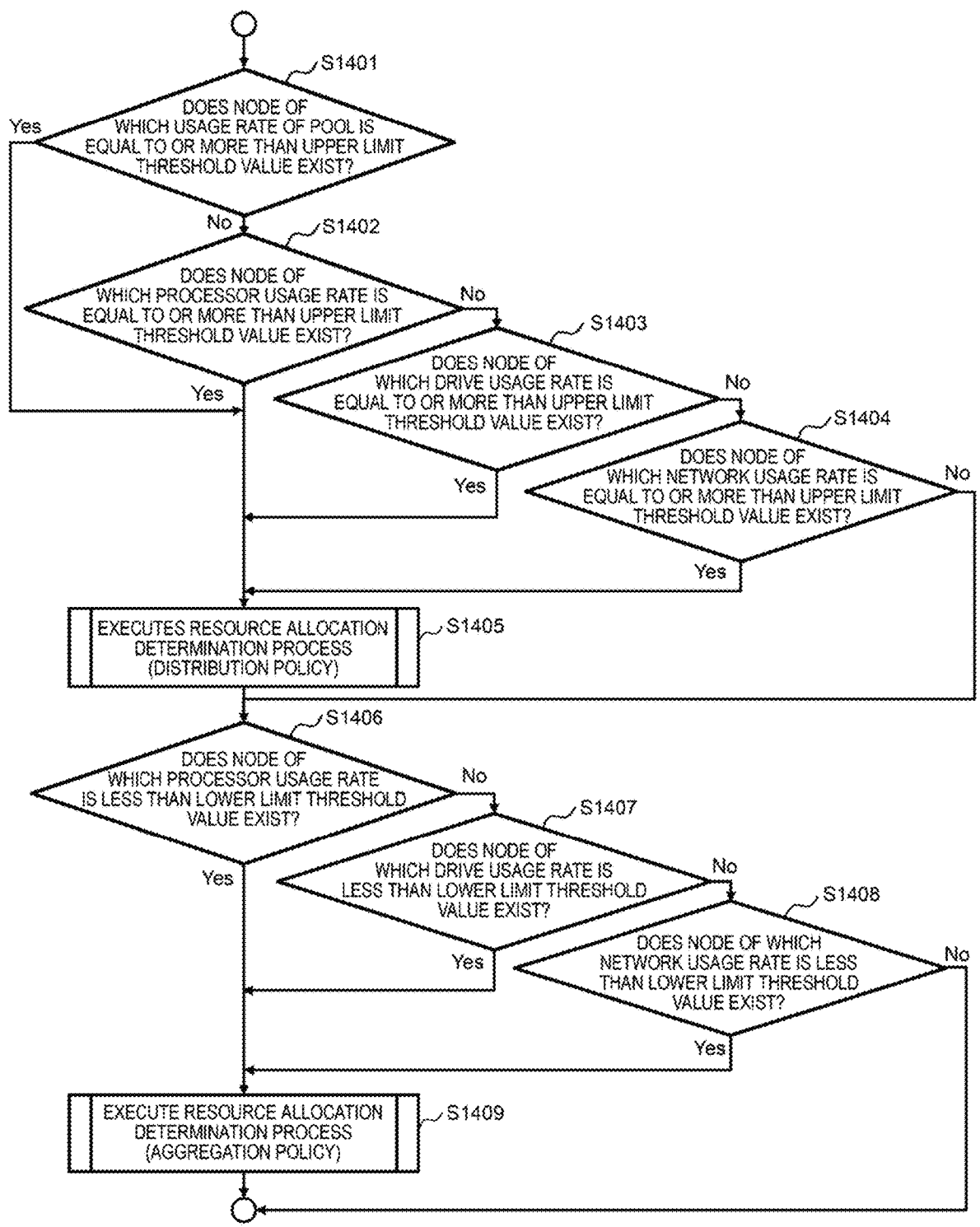
FIG. 14 is a diagram illustrating an example of a flowchart related to a rebalancing necessity determination process according to the first embodiment.

FIG. 14 is a diagram illustrating an example of a flowchart related to the rebalancing necessity determination process. The process may be periodically executed by the storage system 200, may be executed at any time by the user (manually), may be executed after completion of the read process or the write process, and may be executed after the execution of the cluster configuration change process described later.

In step S1401, the rebalancing necessity determination processing program 424 determines whether or not there exists the node 100 of which usage rate of the storage pool 312 is equal to or more than the upper limit threshold value. When it is determined that there exists the node 100 of which usage rate of the storage pool 312 is equal to or more than the upper limit threshold value, the rebalancing necessity determination processing program 424 shifts the process to step S1405, and when it is determined that the node 100 does not exist, the rebalancing necessity determination processing program 424 shifts the process to step S1402.

In step S1402, the rebalancing necessity determination processing program 424 determines whether or not there exists a node 100 of which usage rate of the processor 211 is equal to or more than the upper limit threshold value. When it is determined that there exists the node 100 of which usage rate of the processor 211 is equal to or more than the upper limit threshold value, the rebalancing necessity determination processing program 424 shifts the process to step S1405, and when it is determined that the node 100 does not exist, the rebalancing necessity determination processing program 424 shifts the process to step S1403.

In step S1403, the rebalancing necessity determination processing program 424 determines whether or not there exists a node 100 of which usage rate of the drive 214 is equal to or more than the upper limit threshold value. When it is determined that there exists the node 100 of which usage rate of the drive 214 is equal to or more than the upper limit threshold value, the rebalancing necessity determination processing program 424 shifts the process to step S1405, and when it is determined that the node 100 does not exist, the rebalancing necessity determination processing program 424 shifts the process to step S1404.

In step S1404, the rebalancing necessity determination processing program 424 determines whether or not there exists anode 100 of which usage rate of the network 220 (NIC) is equal to or more than the upper limit threshold value. When it is determined that there exists the node 100 of which usage rate of the network 220 is equal to or more than the upper limit threshold value, the rebalancing necessity determination processing program 424 shifts the process to step S1405, and when it is determined that the node 100 does not exist, the rebalancing necessity determination processing program 424 shifts the process to step S1406.

In step S1405, the rebalancing necessity determination processing program 424 executes the resource allocation determination process (distribution policy). It is noted that the resource allocation determination process (distribution policy) will be described later with reference to FIG. 15.

In step S1406, the rebalancing necessity determination processing program 424 determines whether or not there exists the node 100 of which usage rate of the processor 211 is less than the lower limit threshold value. When it is determined that there exists the node 100 of which usage rate of the processor 211 is less than the lower limit threshold value, the rebalancing necessity determination processing program 424 shifts the process to step S1409, and when it is determined that the node 100 does not exist, the rebalancing necessity determination processing program 424 shifts the process to step S1407.

In step S1407, the rebalancing necessity determination processing program 424 determines whether or not there exists the node 100 of which usage rate of the drive 214 is less than the lower limit threshold value. When it is determined that there exists the node 100 of which usage rate of the drive 214 is less than the lower limit threshold value, the rebalancing necessity determination processing program 424 shifts the process to step S1409, and when it is determined that the node 100 does not exist, the rebalancing necessity determination processing program 424 shifts the process to step S1408.

In step S1408, the rebalancing necessity determination processing program 424 determines whether or not there exists the node 100 of which usage rate of the network 220 (NIC) is less than the lower limit threshold value. When it is determined that there exists the node 100 of which usage rate of the network 220 is less than the lower limit threshold value, the rebalancing necessity determination processing program 424 shifts the process to step S1409, and when it is determined that the node 100 does not exist, the rebalancing necessity determination processing program 424 ends the process.

In step S1409, the rebalancing necessity determination processing program 424 executes the resource allocation determination process (aggregation policy). It is noted that the resource allocation determination process (aggregation policy) will be described later with reference to FIG. 16.

In addition, step S1402 to step S1404 and step S1406 to step S1408 are to determine the load of the node 100, and when one virtual volume 313 is provided in the node 100, these steps are to determine the load of the virtual volume 313.

In addition, the metric for determining whether or not to execute the resource allocation determination process described with reference to FIG. 14 may use the IOPS and/or the transfer amount for the virtual volume 313 in addition to the processor 211, the drive 214, and the port 215. When the IOPS or the transfer amount is used as a metric, different threshold values may be set for read and write for the determination.

In addition, in order to reduce the load on the own-system node, each node 100 may migrate the virtual volume 313 that does not migrate in the area among the virtual volumes 313 provided by the own-system node to the other-system node. Accordingly, in some cases, it may be possible to return the area (migrate the area) to the virtual volume 313 that migrates in the area.

Figure 15:
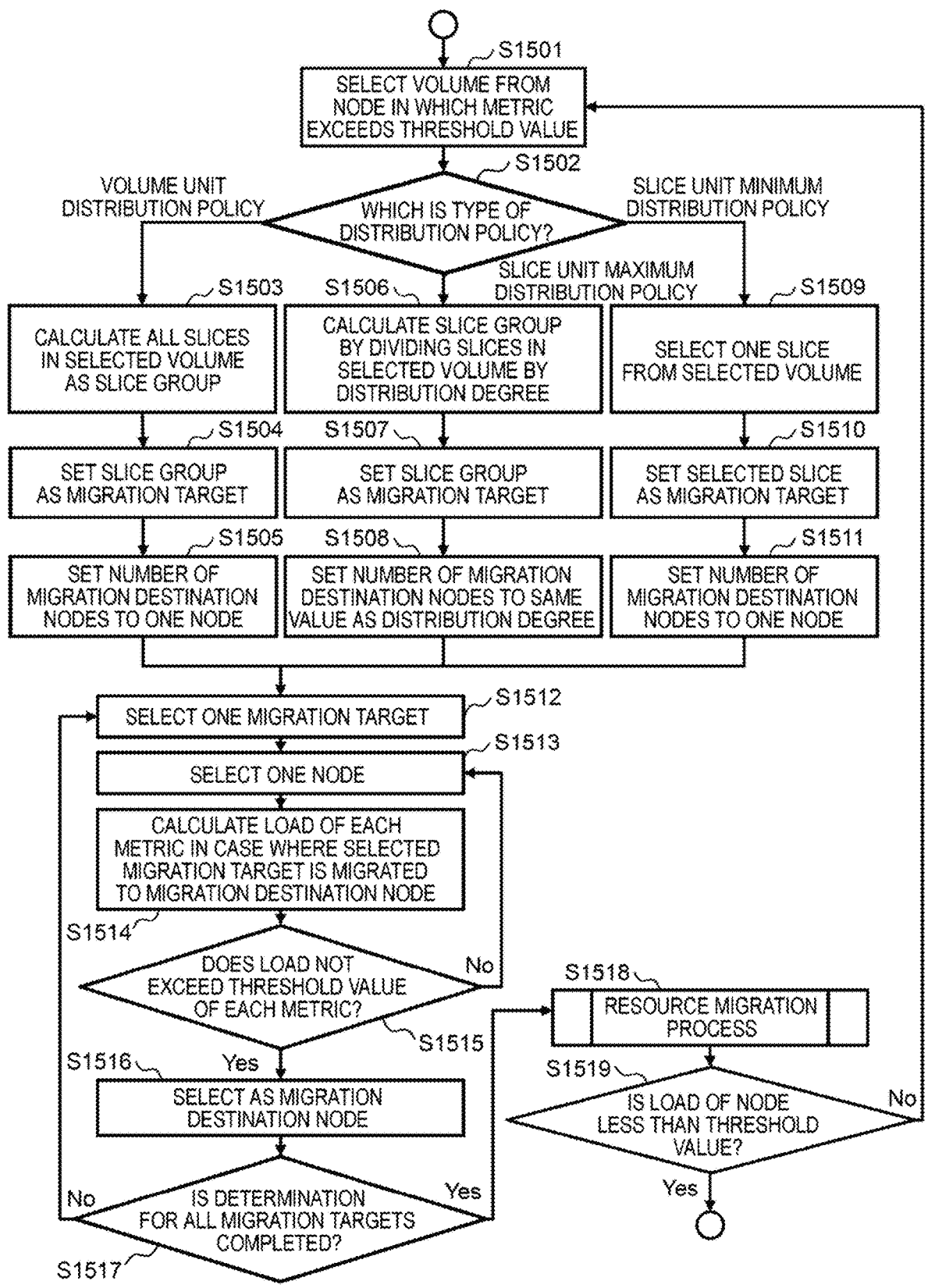
FIG. 15 is a diagram illustrating an example of a flowchart related to a resource allocation determination process according to the first embodiment.

FIG. 15 is a diagram illustrating an example of a flowchart related to the resource allocation determination process based on the distribution policy.

In step S1501, the resource allocation determination processing program 425 selects the node 100 in which each metric (processor 211, drive 214, network 220, or the like) is equal to or more than the upper limit threshold value as the node 100 (migration source node) of the migration source and selects the virtual volume 313 that is the migration target. In other words, the resource allocation determination processing program 425 selects the node 100 having no margin in the load of the processor 211, the drive 214, and the network 220 and selects the virtual volume 313 of the data migration source (herein, also referred to as a distribution source).

More specifically, the resource allocation determination processing program 425 selects the virtual volume 313 defined in the node 100 selected in step S1402, step S1403, or step S1404 of the rebalancing necessity determination process. For example, in a case where the resource allocation determination processing program 425 has a hyper-converged infrastructure (HCI) configuration in which the application 301 operates in the same node 100 as the storage program 311 when the virtual volume 313 is selected, the resource allocation determination processing program 425 performs selection avoiding the virtual volume 313 used by application 301 in the same node 100. This is because, when the virtual volume 313 used by the application 301 in the same node 100 is selected and distributed, the application 301 accesses the data via the network 220, so that the process efficiency is decreased.

Additionally speaking, when there is one virtual volume 313 defined in the node 100 selected in step S1403 or step S1404, the resource allocation determination processing program 425 selects the virtual volume 313.

In step S1502, the resource allocation determination processing program 425 determines the distribution policy set in the virtual volume 313 or the storage system 200. When it is determined that the distribution policy is the volume unit distribution policy, the resource allocation determination processing program 425 shifts the process to step S1503, when it is determined that the distribution policy is the slice unit maximum distribution policy (slice unit even distribution policy), the resource allocation determination processing program 425 shifts the process to step S1506, and when it is determined that the distribution policy is the slice unit minimum distribution policy, the resource allocation determination processing program 425 shifts the process to step S1509.

The volume unit distribution policy is a policy in which the load is distributed in units of virtual volumes 313. In the volume unit distribution policy, the slices 314 are migrated together in units of virtual volumes 313. In the volume unit distribution policy, since the slice 314 is migrated in units of virtual volumes 313, the load sharing can be performed while data aggregation is always maintained.

The slice unit maximum distribution policy is a policy in which the load is distributed in units of slices 314. In the slice unit maximum distribution policy, the slices 314 are distributed by the number of nodes having the maximum distribution degree set in the virtual volume 313. In the slice unit maximum distribution policy, since the slices 314 are distributed at the maximum distribution degree, the load sharing of the high-load node 100 (virtual volume 313) can be performed quickly.

The slice unit minimum distribution policy is a policy in which the load is distributed in units of slices 314. In the slice unit minimum distribution policy, the slices 314 in the virtual volume 313 are distributed one by one. In the slice unit minimum distribution policy, since the slices 314 are distributed one by one, only the minimum load is released from the high-load node 100 (virtual volume 313) while maintaining the locality of data as much as possible, so that overload state is avoided.

These distribution policies may be set in advance by the user for the virtual volume 313, or the storage system 200 may automatically select the distribution policy according to the situation. As an example of the method in which the storage system 200 automatically selects the policy, basically, the storage system 200 applies the volume unit distribution policy, and when the virtual volume 313 is insufficient in the performance of one node 100, the storage system 200 switches the volume unit distribution policy to the slice unit maximum distribution policy or the slice unit minimum distribution policy. In addition, when the load of the virtual volume 313 is suddenly increased, the storage system 200 applies the slice unit maximum distribution policy, and when the load of the virtual volume 313 is gradually increased, the storage system 200 applies the slice unit minimum distribution policy.

In step S1503, step S1504, and step S1505, the resource allocation determination processing program 425 performs a pre-process for migrating the slices 314 in units of virtual volumes 313.

In step S1503, the resource allocation determination processing program 425 groups all the slices 314 in the selected virtual volume 313 as a slice group. For example, the resource allocation determination processing program 425 stores the slice IDs that are migration target from the slice management table 820 as a list in the memory 212.

In step S1504, the resource allocation determination processing program 425 sets the calculated slice group as a migration target.

In step S1505, the resource allocation determination processing program 425 sets the number of migration destination nodes to "1 node".

In step S1506, step S1507, and step S1508, the resource allocation determination processing program 425 performs a pre-process for migrating the slices 314 with the maximum distribution degree set in the virtual volume 313.

In step S1506, the resource allocation determination processing program 425 divides all the slices 314 in the selected virtual volume 313 by the maximum distribution degree set in the virtual volume 313 and groups the slices 314 as a slice group. For example, in the grouping, when a plurality of the hosts 101 that access the selected virtual volume 313 exist and there is a bias (locality) in the slice 314 that is the access target for each host 101, the resource allocation determination processing program 425 groups the slices 314 that are the access targets for each host 101. In addition, for example, the resource allocation determination processing program 425 may check the slice monitor information management table 940 and may group all the slices 314 in the virtual volume 313 so that the loads are evenly distributed in the node 100 having the maximum distribution degree.

In step S1507, the resource allocation determination processing program 425 sets the calculated slice group as a migration target.

In step S1508, the resource allocation determination processing program 425 sets the number of migration destination nodes to the same value as the maximum distribution degree.

In step S1509, step S1510, and step S1511, the resource allocation determination processing program 425 performs the pre-process for migrating the slices 314 with the minimum distribution degree (that is, one slice).

In step S1509, the resource allocation determination processing program 425 selects one slice 314 from the selected virtual volume 313.

In step S1510, the resource allocation determination processing program 425 sets the selected slice 314 as the migration target.

In step S1511, the resource allocation determination processing program 425 sets the number of migration destination nodes to "1 node".

In step S1512, the resource allocation determination processing program 425 selects one migration target. When the slice group is generated in the pre-process, the resource allocation determination processing program 425 selects the slice group as the migration target, and when the slice 314 is selected as it is, the resource allocation determination processing program 425 selects the slice 314 as the migration target.

In step S1513, the resource allocation determination processing program 425 selects one node 100 as the migration destination. As an example of the method of selecting the migration destination node, there is a method in which the resource allocation determination processing program 425 selects the node 100 having a margin in the load of each metric (processor 211, drive 214, network 220, or the like) except for the migration source node.

In step S1514, the resource allocation determination processing program 425 calculates the load of each metric (processor 211, drive 214, network 220, or the like) of the migration destination node when the selected migration target is migrated to the migration destination node.

In step S1515, the resource allocation determination processing program 425 determines whether or not the load of each metric (processor 211, drive 214, network 220, or the like) of the migration destination node calculated in step S1514 exceeds the threshold value. When it is determined that there is a metric in which the load exceeds the threshold value, the resource allocation determination processing program 425 shifts the process to step S1513, and when it is determined that the load does not exceed the threshold value in all the metrics, the resource allocation determination processing program. 425 shifts the process to step S1516. It is noted that the upper limit threshold value of each metric (processor 211, drive 214, network 220, or the like) and the threshold value of each metric in step S1515 may be the same or different.

In step S1516, the resource allocation determination processing program 425 selects the node 100 determined in step S1515 as the migration destination node.

In step S1517, the resource allocation determination processing program 425 determines whether or not the determination for all the migration targets is completed. When the determination for all the migration targets is completed, the resource allocation determination processing program 425 shifts the process to step S1518, and when the determination for all the migration targets is not completed, the resource allocation determination processing program 425 shifts the process to step S1512.

In step S1518, the resource allocation determination processing program 425 executes the resource migration process for the slice group or the slices 314 as the migration target. The resource migration process will be described later with reference to FIG. 17.

In step S1519, the resource allocation determination processing program 425 determines whether or not the load of the node 100 (virtual volume 313) having exceeded the threshold value is less than the threshold value. When it is determined that the load of the node 100 is not less than the threshold value, the resource allocation determination processing program 425 shifts the process to step S1501, and when it is determined that the load of the node 100 is less than the threshold value, the resource allocation determination processing program 425 ends the process.

Figure 16:
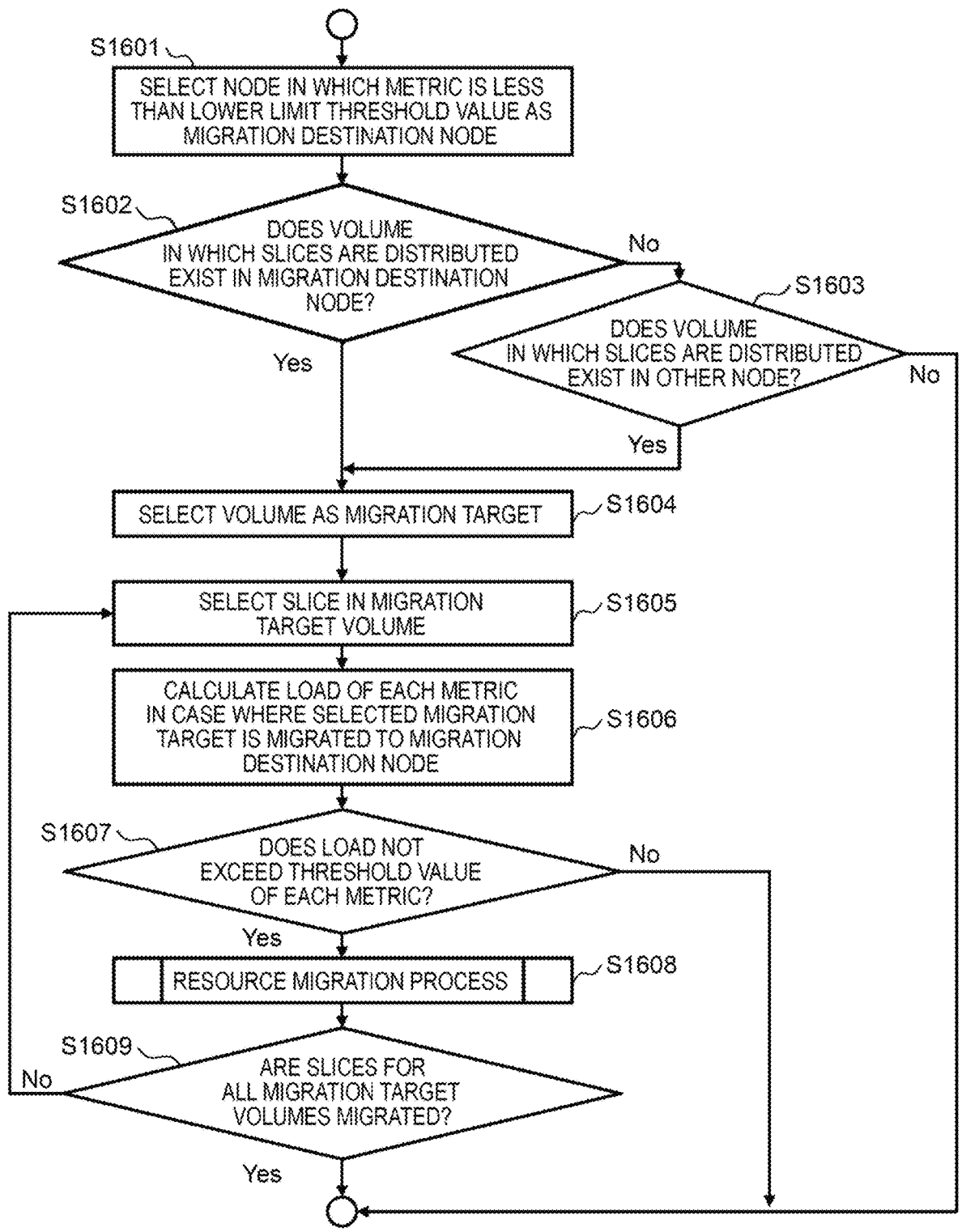
FIG. 16 is a diagram illustrating an example of a flowchart related to the resource allocation determination process according to the first embodiment.

FIG. 16 is a diagram illustrating an example of a flowchart related to the resource allocation determination process based on the aggregation policy.

In step S1601, the resource allocation determination processing program 425 selects a node in which each metric (processor 211, drive 214, network 220, or the like) is less than the lower limit threshold value as the migration destination node. In other words, the resource allocation determination processing program 425 selects the node 100 (virtual volume 313) having a margin in the load of the processor 211, the drive 214, the network 220, or the like and sets the selected node 100 as the node 100 (herein, also referred to as an aggregation destination) of the migration destination of the data. For example, the resource allocation determination processing program 425 selects the node 100 selected in step S1406, step S1407, or step S1408 of the rebalancing necessity determination process.

In step S1602, the resource allocation determination processing program 425 determines whether or not the virtual volume 313 in which the slices 314 are distributed exists in the migration destination node selected in step S1601. When it is determined that the virtual volume 313 in which the slices 314 are distributed exists, the resource allocation determination processing program 425 shifts the process to step S1604, and when it is determined that the virtual volume 313 in which the slices 314 are distributed does not exist, the resource allocation determination processing program 425 shifts the process to step S1603.

In step S1603, the resource allocation determination processing program 425 determines whether or not the virtual volume 313 in which the slices 314 are distributed exists in the node 100 other than the migration destination node selected in step S1601. When it is determined that the virtual volume 313 in which the slices 314 are distributed exists, the resource allocation determination processing program 425 shifts the process to step S1604, and when it is determined that the virtual volume 313 in which the slices 314 are distributed does not exist, since the virtual volume 313 of the aggregation target (migration target) does not exists, the resource allocation determination processing program 425 ends the process.

As described above, in step S1602 and step S1603, the resource allocation determination processing program 425 selects the virtual volume 313 that is the migration target. In the selecting, the resource allocation determination processing program 425 has an effect of reducing the amount of migration of the slice 314 at the time of aggregation by preferentially selecting the virtual volume 313 on the node 100 selected as the migration destination node.

In step S1604, the resource allocation determination processing program 425 selects the selected virtual volume 313 as the migration target.

Additionally speaking, in some cases, when there is a node 100 having a margin in the load on the virtual volume 313 and the slices 314 of the virtual volume 313 are distributed, the resource allocation determination processing program 425 sets the node 100 as the migration destination node, and the virtual volume 313 in which the slices 314 of the virtual volume 313 are distributed may be selected as the migration target.

In step S1605, the resource allocation determination processing program 425 selects one slice 314 in the migration target volume. As a selection method, for example, by referring to the slice monitor information management table 940, the slice 314 having a high process load is selected from the slices 314 in the migration target volume.

In step S1606, the resource allocation determination processing program 425 calculates the load of each metric (processor 211, drive 214, network 220, or the like) when the selected slice 314 is migrated to the migration destination node.

In step S1607, the resource allocation determination processing program 425 determines whether or not the load of each metric (processor 211, drive 214, network 220, or the like) after migrating the slice 314 calculated in step S1606 exceeds the threshold value. When it is determined that there is a metric that exceeds the threshold value, the resource allocation determination processing program 425 ends the process, and when it is determined that the threshold value is not exceeded for all the metrics, the resource allocation determination processing program 425 shifts the process to step S1608.

In step S1608, the resource allocation determination processing program 425 requests the node 100 that provides the virtual volume 313 of the migration target to execute the resource migration process for the slice 314 that is the migration target. The resource migration process will be described later with reference to FIG. 17.

In step S1609, the resource allocation determination processing program 425 determines whether or not the determination as to whether or not to migrate is performed with respect to all the slices 314 in the migration target volume. When the resource allocation determination processing program 425 performs the determination as to whether or not to migrate with respect to all slices 314, the process is ended, and when the determination as to whether or not to migrate is not performed with respect to all slices 314, the resource allocation determination processing program 425 shifts the process to step S1605, and the process is performed on the slice 314 that has not yet been determined.

Figure 17:
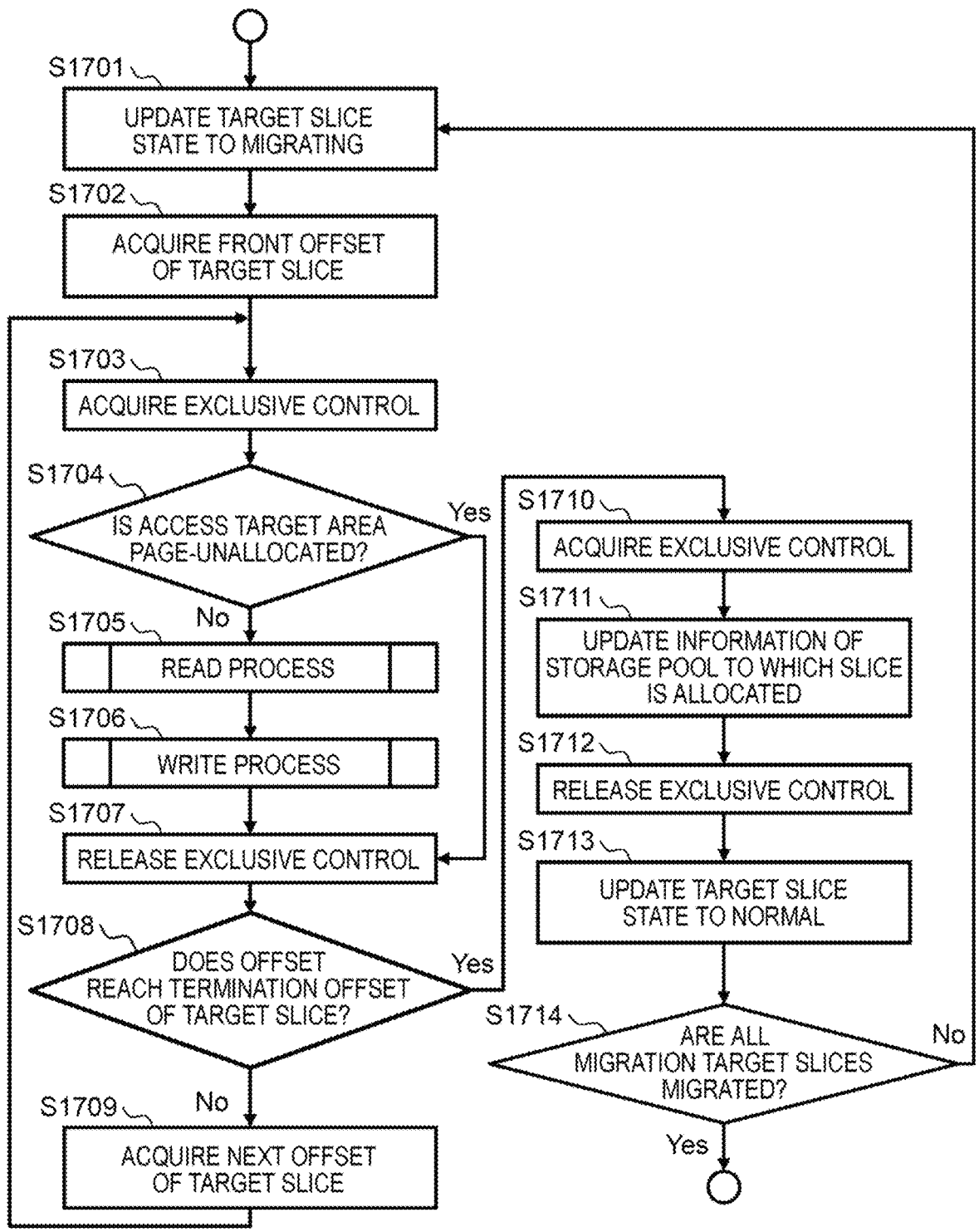
FIG. 17 is a diagram illustrating an example of a flowchart related to a resource migration process according to the first embodiment.

FIG. 17 is a diagram illustrating an example of a flowchart related to the resource migration process. In the resource migration process, the allocation destination of the slice 314 that is the process target is migrated from the currently allocated storage pool 312 to the storage pool 312 of another node 100. When migrating the allocation destination of the slice 314, the resource migration processing program 426 reads the data written in the slice 314 from the storage pool 312 of the migration source and writes the data to the storage pool 312 of the migration destination.

In step S1701, the resource migration processing program 426 updates the state of the slice 314 that is the migration target to migrating. More specifically, the resource migration processing program 426 acquires the record of the slice 314 that is the migration target from the slice management table 820 and updates the value of the state 824 to "Migrating".

In step S1702, the resource migration processing program 426 acquires a front offset of the slice 314 that is the migration target. More specifically, the resource migration processing program 426 acquires the pool volume ID and the pool volume LBA by referring to the page mapping table 830 and referring to the record corresponding to the slice ID of the slice 314 that is the migration target. Next, the resource migration processing program 426 acquires the logical drive ID by referring to the pool volume management table 610 and referring to the record corresponding to the acquired pool volume ID. Next, the resource migration processing program 426 acquires the record corresponding to the acquired logical drive ID and acquires the drive ID and the start offset by referring to the logical drive management table 630 and obtains the address of the access destination drive 214 from the pool volume LBA previously acquired. For example, the resource migration processing program 426 calculates as follows.

access destination address=start offset+pool volume LBA

In step S1703, the resource migration processing program 426 acquires the exclusive control of the area of the access destination.

In step S1704, the resource migration processing program 426 determines whether or not the page 315 is unallocated to the storage pool 312 for the offset data that is a process target. When it is determined that the page is unallocated, the resource migration processing program 426 shifts the process to step S1707, and when it is determined that the page is not unallocated, the resource migration processing program 426 shifts the process to step S1705.

In step S1705, the resource migration processing program 426 issues a read to the area of the storage pool 312 as the migration source of the slice 314 corresponding to the acquired offset. More specifically, the read process is executed. It is noted that the operation of the read process is as described with reference to FIG. 11.

In step S1706, the resource migration processing program 426 issues a write to the area of the storage pool 312 as the migration destination of the slice 314 corresponding to the acquired offset with the data read in step S1705. As the write destination, a write is issued to the slice 314 of the migration source. In the slice 314 of the migration source, determination of Yes is made at the branch of step S1206 in the write processing program 422, and data is written to the slice 314 of the migration destination. However, a write issuing destination in step S1706 may be the slice 314 of the migration destination. It is noted that the operation of the write process is as described with reference to FIG. 12.

In step S1707, the resource migration processing program 426 releases the exclusive control of the area of the access destination.

In step S1708, the resource migration processing program 426 determines whether or not the offset of the access destination that is the current process target is a termination offset of the slice 314 that is the migration target. When it is determined that the offset of the access destination is the termination offset, the resource migration processing program 426 shifts the process to step S1710, and when it is determined that the offset of the access destination is not the termination offset, the resource migration processing program 426 shifts the process to step S1709.

In step S1709, the resource migration processing program 426 acquires the next offset of the slice 314 that is the migration target.

In step S1710, the resource migration processing program 426 acquires the exclusive control regarding the control information of the slice 314 that is the migration target. More specifically, the resource migration processing program 426 acquires the exclusive control of the record corresponding to the slice ID of the slice 314 of the access destination of the slice management table 820.

In step S1711, the resource migration processing program 426 updates the information of the storage pool 312 to which the slice 314 is allocated. More specifically, the resource migration processing program 426 updates the information of the storage pool ID 823 of the slice management table 820 from the storage pool ID of the migration source to the storage pool ID of the migration destination.

In step S1712, the resource migration processing program 426 releases the exclusive control regarding the control information of the slice 314 that is the migration target. More specifically, the resource migration processing program 426 releases the exclusive control of the record corresponding to the slice ID of the slice 314 of the access destination of the slice management table 820.

In step S1713, the resource migration processing program 426 normally updates the state of the slice 314 that is the migration target. More specifically, the resource migration processing program 426 acquires the record of the slice 314 that is the migration target from the slice management table 820 and updates the value of the state 824 to "Normal".

In step S1714, the resource migration processing program 426 determines whether or not all the slices 314 that are the migration targets have been migrated. When it is determined that all the slices 314 that are the migration targets are not migrated, the resource migration processing program 426 shifts the process to step S1701, and when it is determined that all the slices 314 that are the migration targets are migrated, the resource migration processing program 426 ends the process.

Figure 18:
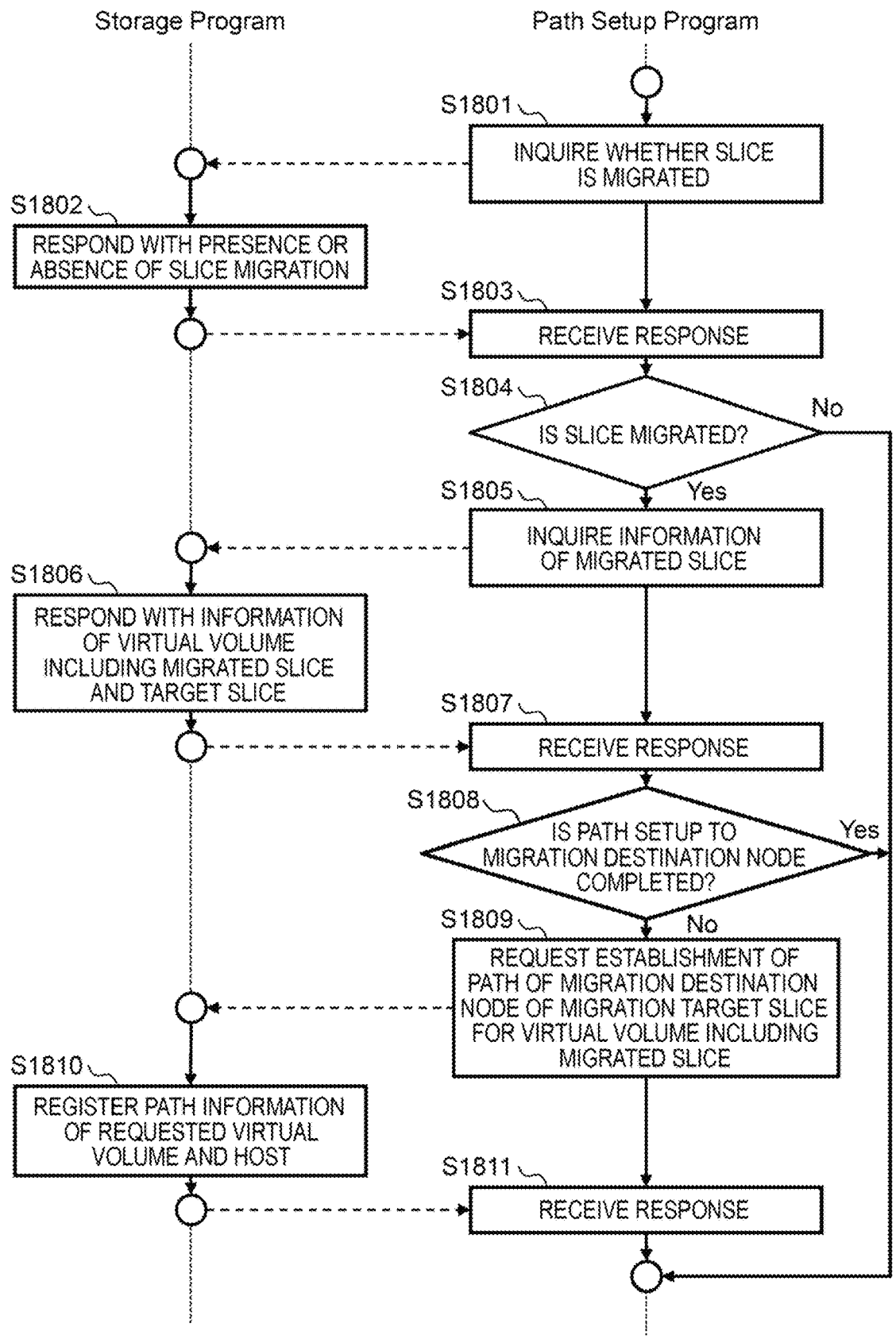
FIG. 18 is a diagram illustrating an example of a flowchart related to a front-end path setup process according to the first embodiment.

FIG. 18 is a diagram illustrating an example of a flowchart related to the front-end path setup process.

In step S1801, the front-end path setup processing program 427 of the path setup program 302 inquires the storage program 311 whether or not there has been a migration of the slice 314.

In step S1802, the front-end path setup processing program 427 of the storage program 311 determines whether or not the slice 314 is migrated and responds to the path setup program 302. More specifically, the storage program 311 stores the migration record of the slice 314 up to the current time and the time information at the time of the previous inquiry from the path setup program 302 as a log and checks whether or not the migration record of the slice 314 has been updated after the time of the previous inquiry from the path setup program 302. When the migration record of the slice 314 has been updated, the front-end path setup processing program 427 of the storage program 311 determines that there has been a migration, and when the migration record has not been updated, the front-end path setup processing program 427 determines that there has been no migration, and responds to the path setup program 302 with the determination result.

In step S1803, the front-end path setup processing program 427 of the path setup program 302 receives the response from the storage program 311.

In step S1804, the front-end path setup processing program 427 of the path setup program 302 determines whether or not the slice 314 is migrated based on the response content from the storage program 311. When it is determined that the slice 314 is migrated, the front-end path setup processing program 427 of the path setup program 302 shifts the process to step S1805, and when it is determined that the slice 314 is not migrated, the front-end path setup processing program 427 ends the process.

In step S1805, the front-end path setup processing program 427 of the path setup program 302 inquires the storage program 311 for the information of the migrated slice 314.

In step S1806, the front-end path setup processing program 427 of the storage program 311 responds to the path setup program 302 with the information on the migrated slice 314 and the virtual volume 313 including the slice 314.

In step S1807, the front-end path setup processing program 427 of the path setup program 302 receives the response from the storage program 311.

In step S1808, the front-end path setup processing program 427 of the path setup program 302 checks whether or not the path 320 is set in the migration destination node (virtual volume 313 including the migrated slice 314) of the migrated slice 314. When it is determined that the front-end path 320 is set, the front-end path setup processing program 427 of the path setup program 302 ends the process, and when it is determined that the front-end path 320 is not set, the front-end path setup processing program 427 shifts the process to step S1809.

In step S1809, the front-end path setup processing program 427 requests the establishment of the front-end path 320 with the migration destination node of the slice 314 for the virtual volume 313 including the migrated slice 314. The specific procedure for establishing the path between the path setup program 302 and the storage program 311 is based on the protocol of iSCSI (Internet Small Computer System Interface), Fiber Channel, and the like.

In step S1810, the front-end path setup processing program 427 of the storage program 311 registers the path information between the virtual volume 313 and the host 101 requested by the path setup program 302 in the front-end path information table 1010 and responds to the path setup program 302.

In step S1811, the front-end path setup processing program 427 of the path setup program 302 receives the response of the path setup completion from the storage program 311.

Figure 19:
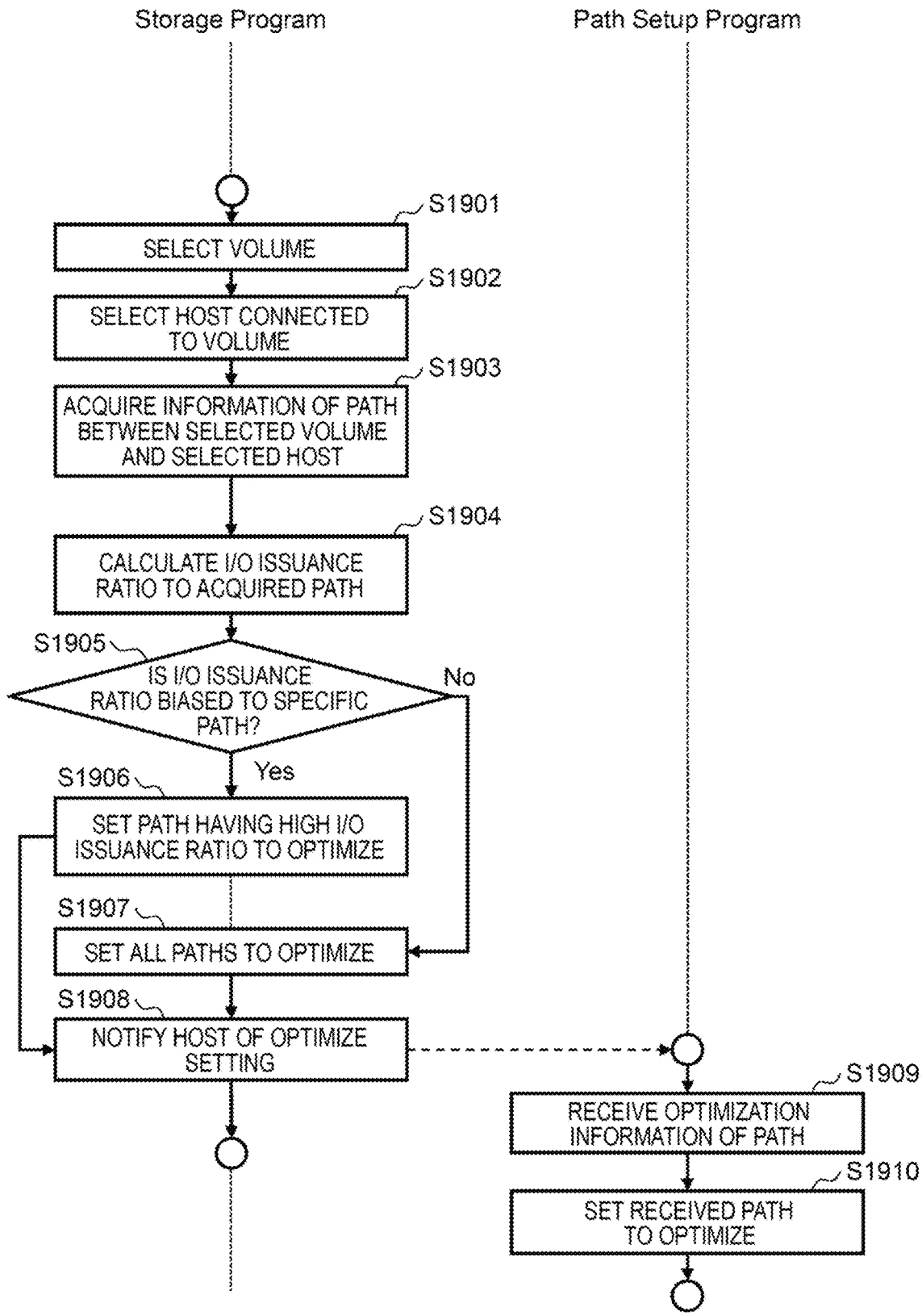
FIG. 19 is a diagram illustrating an example of a flowchart related to the front-end path setup process according to the first embodiment.

FIG. 19 is a diagram illustrating an example of a flowchart related to the front-end path setup process when optimizing the setting of the front-end path 320 based on the mechanism of the ALUA (Asymmetric Logical Unit Access) with the SCSI (Small Computer System Interface) standard.

In step S1901, the front-end path setup processing program 427 of the storage program 311 selects the virtual volume 313 that is the process target. More specifically, for the virtual volume 313 that is the process target, all the defined virtual volumes 313 may be periodically selected, or the virtual volume 313 that has been accessed in the read process or the write process may be selected after the execution of the read process or the write process is completed.

In step S1902, the front-end path setup processing program 427 of the storage program 311 selects the host 101 connected to the virtual volume 313 as the process target. More specifically, for the host 101 that is the process target, all the hosts 101 defined in the virtual volume 313 that is the process target may be selected, or the host 101 that has been accessed in the read process or the write process may be selected after the execution of the read process or the write process is completed.

In step S1903, the front-end path setup processing program 427 of the storage program 311 acquires the information of the path between the selected virtual volume 313 and the selected host 101. More specifically, the front-end path setup processing program 427 acquires the records corresponding to the virtual volume ID of the selected virtual volume 313 and the initiator ID of the selected host 101 by referring to the front-end path information table 1010.

In step S1904, the front-end path setup processing program. 427 calculates the I/O issuance ratio to the front-end path 320 acquired in step S1903. More specifically, the front-end path setup processing program 427 calculates the I/O issuance ratio of path A and path B to be path A: path B=9:1 when the sum 900 IOPS of the read IOPS and the write IOPS is issued to the path A and the sum 100 IOPS of the read IOPS and the write IOPS is issued to path B by referring to the read IOPS 952 and the write IOPS 953 of the front-end path monitor information management table 950. In addition, similarly, the front-end path setup processing program 427 may calculate the ratio of the read and write transfer amounts, may finally employ the one with the larger distribution in the I/O issuance ratios of the paths between the IOPS and the transfer amount, or may employ the average value of the ratio of the IOPS and the transfer amount as the final ratio.

In step S1905, the front-end path setup processing program 427 of the storage program 311 determines whether or not the I/O issuance ratio is biased to the specific front-end path 320 (host 101). For example, the front-end path setup processing program 427 calculates the distribution of the I/O issuance ratios to each front-end paths 320 and determines that a bias has occurred when the distribution exceeds the threshold value. When it is determined that the I/O issuance ratio is biased to the specific front-end path 320, the front-end path setup processing program 427 of the storage program 311 shifts the process to step S1906, and when it is determined that the I/O issuance ratio is not biased to the specific front-end path 320, the front-end path setup processing program 427 shifts the process to step S1907.

In step S1906, the front-end path setup processing program 427 of the storage program 311 sets the front-end path 320 having a high I/O issuance ratio, to "optimize (optimized path)". For example, the front-end path setup processing program 427 updates the ALUA setting 1014 of the record that matches the path ID of the front-end path 320 of which I/O issuance ratio is more than the threshold value to "optimize" and updates the ALUA setting 1014 of the record that matches the path ID of the front-end path 320 of which I/O issuance ratio is not more than the threshold value to "non-optimize" by referring to the front-end path information table 1010.

In step S1907, the front-end path setup processing program 427 of the storage program 311 sets all the front-end paths 320 defined in the selected virtual volume 313 to "optimize (optimized path)" (set to so-called round robin).

In step S1908, the front-end path setup processing program 427 of the storage program 311 notifies the path setup program 302 of the information (optimization information) of the front-end path 320 set to "optimize". In FIG. 19, the information is transmitted in the form of issuing a notification from the storage program 311 to the path setup program 302, but the information may be transmitted in a form of inquiring from the path setup program 302 to the storage program 311.

In step S1909, the front-end path setup processing program 427 of the path setup program 302 receives the optimization information of the front-end path 320 from the storage program 311.

In step S1910, the front-end path setup processing program 427 of the path setup program 302 sets the front-end path 320 received from the storage program 311 to "optimize". After that, the application 301 is controlled so as to issue the I/O preferentially to the optimum path.

Figure 20:
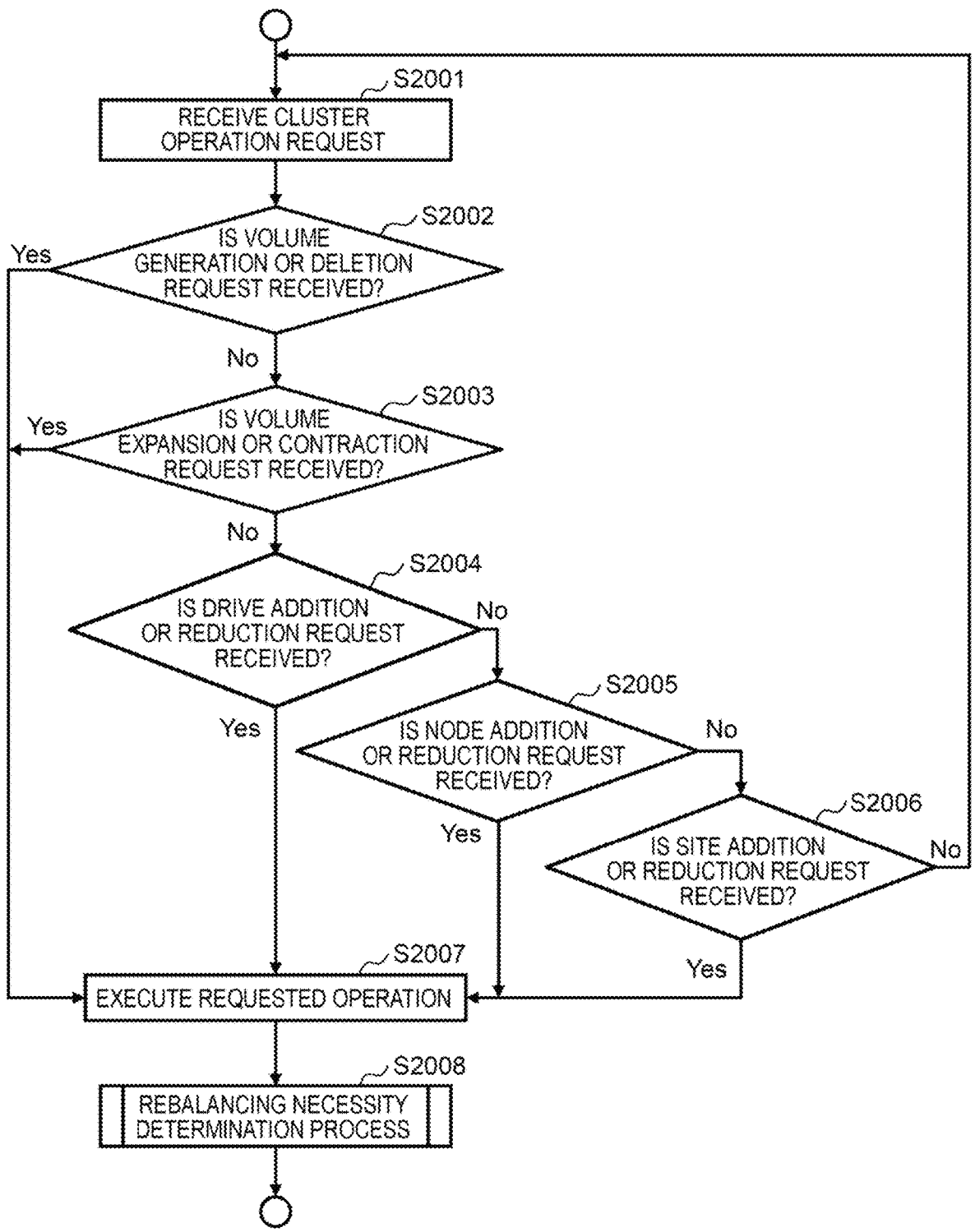
FIG. 20 is a diagram illustrating an example of a flowchart related to a cluster configuration change process according to the first embodiment.

FIG. 20 is a diagram illustrating an example of a flowchart related to the cluster configuration change process.

In step S2001, the cluster configuration change processing program 428 receives the cluster operation request from the user.

In step S2002, the cluster configuration change processing program 428 determines whether or not the received cluster operation request is a request for generating or deleting the virtual volume 313. When it is determined that the received cluster operation request is a request for generating or deleting the virtual volume 313, the cluster configuration change processing program 428 shifts the process to step S2007, and when it is determined that the received cluster operation request is not a request for generating or deleting the virtual volume 313, the cluster configuration change processing program 428 shifts the process to step S2003.

In step S2003, the cluster configuration change processing program 428 determines whether or not the received cluster operation request is a request for expanding or contracting the virtual volume 313. When it is determined that the received cluster operation request is a request for expanding or contracting the virtual volume 313, the cluster configuration change processing program 428 shifts the process to step S2007, and when it is determined that the received cluster operation request is not a request for expanding or contracting the virtual volume 313, the cluster configuration change processing program 428 shifts the process to step S2004.

In step S2004, the cluster configuration change processing program 428 determines whether or not the received cluster operation request is a request for adding or reducing the drive 214. When it is determined that the received cluster operation request is a request for adding or reducing the drive 214, the cluster configuration change processing program 428 shifts the process to step S2007, and when it is determined that the received cluster operation request is not a request for adding or reducing the drive 214, the cluster configuration change processing program 428 shifts the process to step S2005.

In step S2005, the cluster configuration change processing program 428 determines whether or not the received cluster operation request is a request for adding or reducing the node 100. When it is determined that the received cluster operation request is a request for adding or reducing the node 100, the cluster configuration change processing program 428 shifts the process to step S2007, and when it is determined that the received cluster operation request is not a request for adding or reducing the node 100, the cluster configuration change processing program 428 shifts the process to step S2006.

In step S2006, the cluster configuration change processing program 428 determines whether or not the received cluster operation request is a request for adding or reducing the site 201. When it is determined that the received cluster operation request is a request for addition or reduction of site 201, the cluster configuration change processing program 428 shifts the process to step S2007, and when it is determined that the received cluster operation request is not a request for addition or reduction of site 201, the cluster configuration change processing program 428 shifts the process to step S2001.

In step S2007, the cluster configuration change processing program 428 executes the operation requested by the user.

In step S2008, the cluster configuration change processing program 428 executes the rebalancing necessity determination process. It is noted that, since the rebalancing necessity determination process has been described with reference to FIG. 14, the description thereof will be omitted.

Figures 21A, 21B:
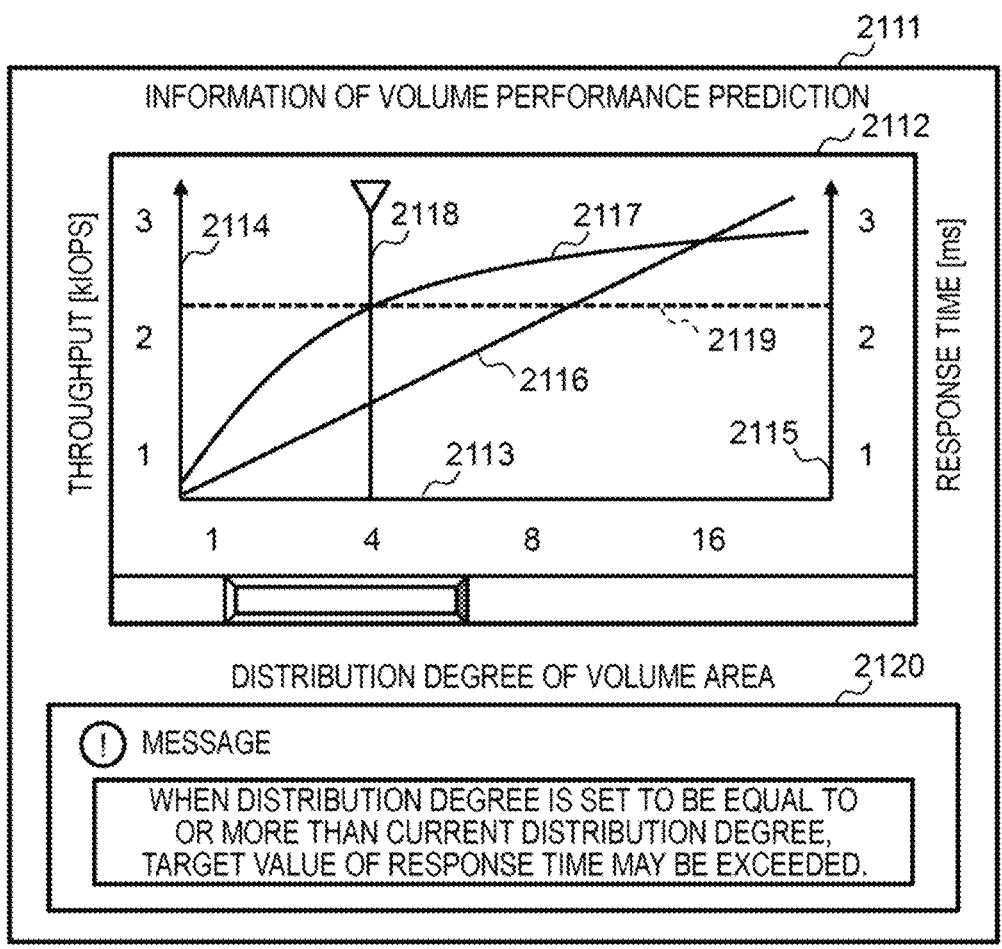
FIG. 21A is a diagram illustrating an example of a GUI according to the first embodiment.
FIG. 21B is a diagram illustrating an example of the GUI according to the first embodiment.

FIG. 21A is a diagram illustrating an example of a volume setting screen (GUI: Graphical User Interface) that can be operated by the user. The volume setting screen 2101 is output to a predetermined computer (for example, a management server or the like) that is communicably connected to the storage system 200.

The volume setting screen 2101 is a screen in which settings are made for each virtual volume 313. The volume setting screen 2101 is configured so that the information on a volume ID 2102 and a distribution degree 2103 can be set.

The volume ID 2102 is an item for designating the virtual volume 313 that is a setting target. The distribution degree 2103 is an item in which information (maximum distribution degree) of the maximum value of the number of nodes in which the slices 314 of the virtual volume 313 that is the setting target are distributed can be set.

FIG. 21B is a diagram illustrating an example of a volume performance prediction screen 2111 (GUI) presented to the user by the storage system 200. The volume performance prediction screen 2111 is output to a predetermined computer (for example, a management server or the like) that is communicably connected to the storage system 200.

The volume performance prediction screen 2111 is configured to include volume performance prediction information 2112 and a message 2120.

The volume performance prediction information 2112 presents information on the maximum distribution degree, the throughput (IOPS), and the response time for the virtual volume 313 that is a checking target to the user. The volume performance prediction information 2112 is configured to include distribution degree information 2113, throughput information 2114, response time information 2115, predicted throughput information 2116, predicted response time information 2117, current distribution degree information 2118, and target performance value information 2119.

The distribution degree information 2113 includes information on the maximum distribution degree. Throughput information 2114 includes information on the IOPS. The response time information 2115 includes information on the response time. The predicted throughput information 2116 includes information on the predicted value of throughput at the corresponding maximum distribution degree. The predicted response time information 2117 includes information on the predicted value of the response time at the corresponding maximum distribution degree. The current distribution degree information 2118 includes information on the maximum distribution degree currently set in the virtual volume 313 that is the check target. The target performance value information 2119 includes information on the performance values of the target (user-expected) throughput and the response time currently set in the virtual volume 313 that is the check target.

In the message 2120, when the predicted response time information 2117 based on the current distribution degree information 2118 exceeds the target performance value information 2119 or when the predicted throughput information 2116 based on the current distribution degree information 2118 is less than the target performance value information 2119, the storage system 200 presents to the user that the target performance value cannot be achieved with the current maximum distribution degree. In addition, the message 2120 presents to the user whether or not the predicted performance can satisfy the target performance value when the maximum distribution degree is changed from the current setting value.

According to the embodiment, capacity and performance can be scaled out for one volume.

(II) Second Embodiment

Figure 22:
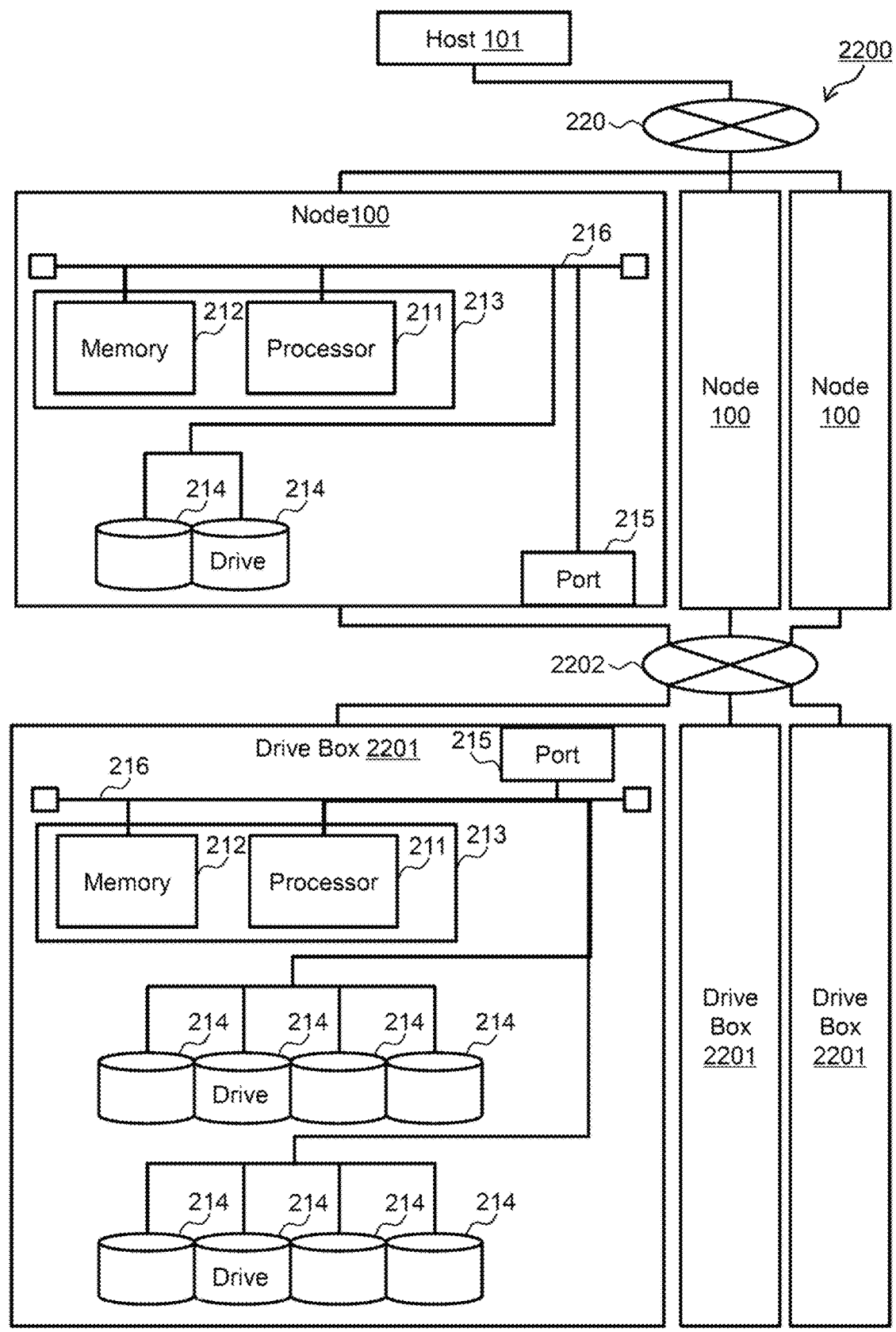
FIG. 22 is a diagram illustrating an example of a configuration related to a storage system according to a second embodiment.

FIG. 22 is a diagram illustrating an example of a configuration according to a storage system 2200 of the present embodiment. The same components as those of the first embodiment is denoted by the same reference numerals, and description thereof is omitted.

The storage system 2200 is configured to include a drive box 2201 in addition to the configuration illustrated in FIG. 2. The drive box 2201 is configured to include, for example, one or more processor packages 213 including a processor 211, a memory 212, and the like, one or more drives 214, and one or more ports 215. Each component is connected via an internal bus 216.

The port 215 is connected to the network 2202 and communicably connected to the node 100 within the site 201. The network 2202 is, for example, a LAN, storage area network (SAN), or a serial attached SCSI (SAS), but the network 2202 is not limited thereto.

In the processor 211, an I/O processing program for the drive box 2201 is operated, and a data compression process, a RAID process for the drive 214 in the drive box 2201, and the like may be performed as necessary. In addition, in addition to the above-mentioned processes, the drive box 2201 may be equipped with ASIC (Application Specific Integrated Circuit) which is dedicated hardware, and the ASIC may be provided with a data compression process, a parity calculation process, and the like.

Figure 23:
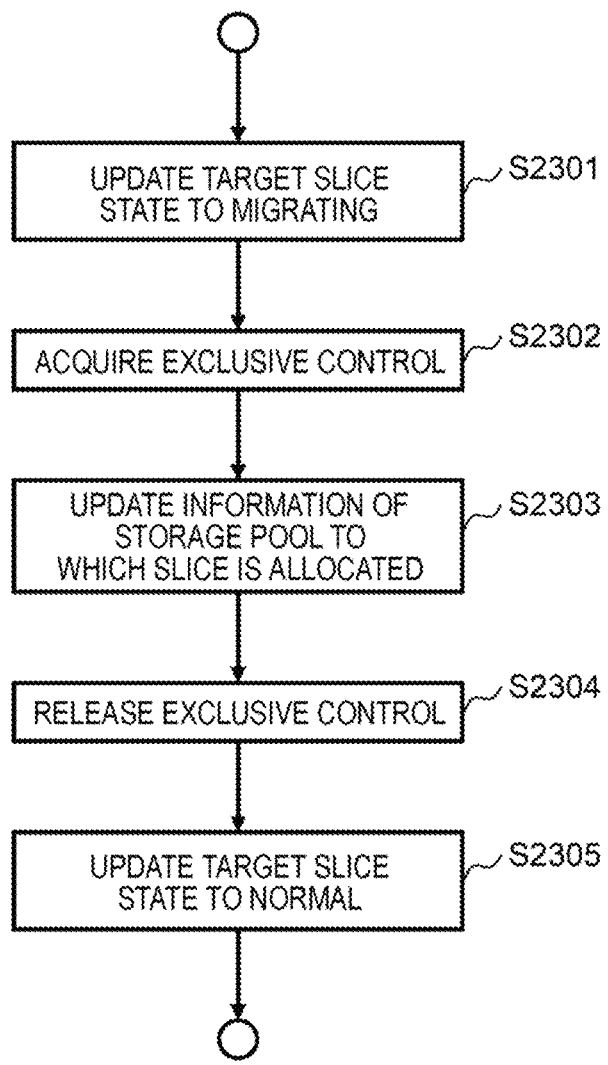
FIG. 23 is a diagram illustrating an example of a flowchart related to a resource migration process according to the second embodiment.

FIG. 23 is a diagram illustrating an example of a flowchart related to the resource migration process in the present embodiment. In the resource migration process, the slice 314 is migrated between the nodes 100 when the rebalancing is required in response to the result of the rebalancing necessity determination process.

The difference from the first embodiment will be described. In the present embodiment, the data in the slice 314 is arranged in the drive box 2201 shared between the nodes 100. For this reason, when migrating the slice 314 between the nodes 100, it is only necessary to update the control information on the allocation of the virtual volume 313 and the slice 314, and the data itself does not need to be migrated. The details will be described below.

In step S2301, the resource migration processing program 426 updates the state of the slice 314 that is the migration target to migrating. More specifically, the resource migration processing program 426 acquires the record of the slice 314 that is the migration target from the slice management table 820 and updates the value of the state 824 to "Migrating".

In step S2302, the resource migration processing program 426 acquires the exclusive control regarding the control information of the slice 314 that is the migration target. More specifically, the resource migration processing program 426 acquires the exclusive control of the record corresponding to the slice ID of the slice 314 of the access destination of the slice management table 820.

In step S2303, the resource migration processing program 426 updates the information of the storage pool 312 to which the slice 314 is allocated. More specifically, the resource migration processing program 426 updates the information of the storage pool ID 823 of the slice management table 820 from the storage pool ID of the migration source to the storage pool ID of the migration destination.

In step S2304, the resource migration processing program 426 releases the exclusive control regarding the control information of the slice 314 that is the migration target. More specifically, the resource migration processing program 426 releases the exclusive control of the record corresponding to the slice ID of the slice 314 of the access destination of the slice management table 820.

In step S2305, the resource migration processing program 426 updates the state of the slice 314 that is the migration target to normal. More specifically, the resource migration processing program 426 acquires the record of the slice 314 that is the migration target from the slice management table 820 and updates the value of the state 824 to "Normal".

According to the embodiment, the performance can be scaled out for one volume without migrating the data.

(III) Appendix

The above-described embodiment includes, for example, the following contents.

In the above-described embodiment, the case where the present invention is applied to a storage system has been described, but the present invention is not limited to this. The present invention can be widely applied to various other systems, devices, methods, and programs.

In addition, in the above-described embodiment, the case where the slice monitor information management table 940 stores the information in which the slice ID 941, the read counter 942, the write counter 943, the read transfer amount 944, the write transfer amount 945, and the monitor start time 946 are associated with each other, has been described, but the present invention is not limited to this. For example, the slice monitor information management table 940 may store the information in which the slice ID 941, the read IOPS, the write IOPS, the read transfer amount 944, and the write transfer amount 945 are associated with each other.

In addition, in the above-described embodiment, the case where the front-end path monitor information management table 950 stores information in which the path ID 951, the read IOPS 952, the write IOPS 953, the read transfer amount 954, and the write transfer amount 955 are associated with each other is described, but the present invention is not limited thereto. For example, the front-end path monitor information management table 950 may be allowed to store the information in which the path ID 951, the read counter, the write counter, the read transfer amount 954, the write transfer amount 955, and the monitor start time are associated with each other.

In addition, in the above-described embodiments, the configuration of each table is an example, and one table may be divided into two or more tables, or all or a portion of the two or more tables may be one table.

In addition, in the above-described embodiments, the screens illustrated and described are examples, and any design may be used as long as the received information is the same.

In addition, in the above-described embodiments, the screens illustrated and described are examples, and any design may be used as long as the information to be presented is the same.

In addition, in the above-described embodiments, the case where the variance value and the average value are used as the statistical values has been described, but the statistical values are not limited to the variance value and the average value. Other statistical values such as a maximum value, a minimum value, a difference between the maximum value and the minimum value, a most frequent value, a median value, and a standard deviation may be used.

The above-described embodiments have, for example, the following characteristic configurations.

(1)

A storage system (for example, a storage system 200, a storage system 2200) includes: a plurality of nodes (for example, nodes 100) including a processor (for example, a processor 211, a processor package 213) that performs a process for providing a volume (for example, a virtual volume 313) including a plurality of areas to one or more hosts (for example, a host 101); and one or more storage devices (for example, drives 214, drive boxes 2201) that are connected to the processor and store data of the volume, wherein each of the plurality of nodes monitors a load of the volume provided by an own node and loads of areas obtained by dividing an area of the volume into a plurality of the areas, and wherein a first node determining that the load of the one volume being monitored is equal to or more than a threshold value migrates a portion of the area included in the one volume to a volume of a second node different from the first node according to the load of the areas obtained by dividing the area of the one volume into the plurality of areas and a policy (a volume unit distribution policy, a slice unit maximum distribution policy, a slice unit minimum distribution policy, or the like) of load sharing (refer to, for example, FIG. 15).

The load of the volume is, for example, at least one of the usage rate of the processor of the own node, the amount of I/O to the storage device of the own node, the I/O response to the storage device of the own node, the amount of I/O to the network interface of the own node, the I/O response to the network interface of the own node, the IOPS for the volume, and the transfer amount for the volume.

In the above-described configuration, when the load of one volume is increased, a portion of the area of the volume is migrated to the volume of another node, so that for example, when a node is added, it is possible to scale out the performance for one volume as well.

(2)

In the storage system, when the first node determines that the load of the one volume is less than the threshold value (refer to, for example, FIG. 14), the first node migrates the portion of the area from the volume of the second node to the one volume (refer to, for example, FIG. 16).

In the above-described configuration, for example, when the load of the volume to which the area is migrated is low, the area is aggregated on the volume, so that the throughput of the volume can be improved and the latency of the volume can be reduced.

(3)

In the storage system, the first node selects a node in which the load of the volume after migrating the portion of the area does not exceed the threshold value as the second node (refer to, for example, steps S1514 to S1516).

With the above-described configuration, for example, it is possible to avoid a situation in which the volume of the migration destination node becomes overloaded and further migration is needed.

(4)

In the storage system, each of the plurality of nodes is correspondingly provided with at least one of the one or more storage devices (refer to, for example, FIG. 2), each of the plurality of nodes stores the data of the area allocated to the own node in the storage device provided in the own node (refer to, for example, FIG. 12), and when it is determined that a capacity of the one volume exceeds a capacity that can be provided (refer to, for example, step S1401), the first node migrates the portion of the area to the volume of the second node.

According to the above-described configuration, for example, the volume provided by each node can use the capacity corresponding to the storage device provided in the storage system.

(5)

In the storage system, each of the plurality of nodes monitors the load (for example, read IOPS, read transfer amount, read counter, or the like) of read on the volume and the load (for example, write IOPS, write transfer amount, write counter or the like) of write on the volume provided by the own node, and when it is determined that the load of read on the one volume is equal to or more than a first threshold value, the first node migrates the portion of the area to the volume of the second node, and when it is determined that the load of the write on the one volume is equal to or more than a second threshold value different from the first threshold value, the first node migrates the portion of the area to the volume of the second node.

The loads applied to the nodes are different between read and write to the volume, but in the above-described configuration, by monitoring the loads and setting different threshold values, it is possible to more appropriately determine, for example, the load on the volume.

(6)

In the storage system, the first node evenly allocates the area included in the one volume to the plurality of nodes (for example, step S1506 and step S1507), and the area allocated to another node different from the first node is migrated to the volume of the node.

In the above-described configuration, for example, the area of the volume can be migrated so that the load due to the migrating area becomes even.

(7)

In the storage system, the first node migrates the area included in the one volume one by one (for example, step S1509 and step S1510) to a volume of another node different from the first node until the load of the one volume falls below the threshold value.

In the above-described configuration, for example, the locality of the data can be remarkably maintained and the minimum load can be released from the volume.

(8)

In the storage system, when the one volume is provided to a plurality of the hosts, the first node collectively sets the areas accessed by the plurality of hosts as a migration target for each host (for example, step S1506 and step S1507) and migrates the area that is the migration target for each host to a volume on another node different from the first node.

In the above-described configuration, for example, when the areas to be accessed are different among the hosts, the area accessed by the host can be collectively migrated.

(9)

In the storage system, the first node migrates another volume different from the one volume among the volumes provided by the own node to another node different from the first node and migrates the portion of the area from the volume of the second node to the one volume.

In the above-described configuration, in some cases, for example, the first node can collect the migrated areas by migrating another volume different from one volume to another node entirely.

(10)

In the storage system, when a path is not set between the volume of the second node to which the portion of the area is migrated and the host accessing the portion of the area, the second node and the host set the path (refer to, for example, FIG. 18).

In the above-described configuration, when a path is not set between the volume of the second node to which the area is migrated and the host accessing the area, the path is set, and thus, for example, when there is an access to the area, it is possible to exchange the data without intervention of the first node.

(11)

In the storage system, when each of the plurality of nodes determines that the load of the volume of the own node is biased to a specific host, each of the plurality of nodes notifies the specific host that the path with the specific host has an optimum attribute (for example, step S1904 to step S1906 and step S1908).

According to the above-described configuration, for example, when the load of the volume is biased to a specific host, the I/O is issued preferentially to the specific host.

(12)

In the storage system, when each of the plurality of nodes determines that the load of the volume of the own node is not biased to the specific host, each of the plurality of nodes notifies all the hosts with which the path is set that all the paths defined in the volume have the optimum attribute (for example, step S1904, step S1905, step S1907, and step S1908).

According to the above-described configuration, when the load of the volume is not biased to a specific host, the I/O is issued evenly to all the hosts accessing the volume.

(13)

In the storage system, the one or more storage devices (for example, a drive box 2201) are commonly provided in the plurality of nodes.

In the above-described configuration, since the computer portion and the storage portion of the node are separated, for example, when the usage rate of the processor is surplus but the capacity of the storage device is insufficient, the storage portion can be increased without increasing the computer portion.

(14)

In the storage system, when the first node migrates the portion of the area to the second node, the first node updates data for managing the portion of the area (for example, the slice management table 820) and does not migrate the data in the portion of the area stored in the one or more storage devices (refer to, for example, FIG. 23).

In the above-described configuration, since the data can be accessed evenly from any node, for example, when the load of the volume is distributed among the nodes, it is possible to distribute the load of the volume merely by transferring the ownership (exclusive right, metadata) of the volume.

(15)

The storage system is provided with a computer (for example, a management server) that calculates and outputs a throughput and a response time according to the number of migration destination nodes in the area of the volume provided by the plurality of nodes.

According to the above-described configuration, for example, the user can easily determine the number (for example, a maximum distribution degree) of migration destination nodes of the area.

Each of the plurality of nodes monitors the load of the volume in units of areas included in the volume (for example, FIG. 13B).

The storage system includes a computer that outputs a GUI for the user to designate the maximum number of nodes that can be distributed by one volume (FIG. 21A).

In addition, the above-described configuration may be appropriately changed, rearranged, combined, or omitted within a range without exceeding the spirit of the present invention.

The items included in the list in the form of "at least one of A, B, and C" can be understood to denote (A), (B), (C), (A and B), (A and C), (B and C), or (A, B, and C). Similarly, the items listed in the form of "at least one of A, B, or C" may denote (A), (B), (C), (A and B), (A and C), (B and C), or (A, B, and C).

What is claimed is:

1. A storage system comprising:
   one or more storage devices that store data; and
   a plurality of nodes including a processor that performs processing of data,
   wherein the processor provides a volume including a plurality of areas as a target to input and output the data and processes the data which is input and output via the areas of the volume;
   wherein the plurality of nodes monitor a load;
   wherein a first node determining that the load of its own node is equal to or more than a threshold value migrates a portion of the areas included in one volume to a volume of a second node different from the first node according to the load of the areas and a policy of load sharing, while keeping other areas, which are included in the one volume, at the first node, so that a plurality of processors for the plurality of nodes take charge of the one volume;
   wherein when the first node determines that the load of its own node is less than the threshold value, the first node migrates the portion of the areas of the one volume from the second node to the first node; and
   wherein while the second node stores the portion of the areas of the one volume and the second node determines that the load of its own node is less than the threshold value, the second node migrates the other areas of the one volume from the first node to the second node.

2. The storage system according to claim 1, wherein the first node selects a node in which the load of the volume after migrating the portion of the areas does not exceed the threshold value as the second node.

3. The storage system according to claim 1,
   wherein each of the plurality of nodes is correspondingly provided with at least one of the one or more storage devices,
   wherein each of the plurality of nodes stores the data of the areas allocated to the own node in the storage device provided in the own node, and
   wherein when it is determined that a capacity of the one volume exceeds a capacity that can be provided, the first node migrates the portion of the areas to the volume of the second node.

4. The storage system according to claim 1,
wherein each of the plurality of nodes monitors the load of read on the volume and the load of write on the volume provided by the own node, and
wherein when it is determined that the load of read on the one volume is equal to or more than a first threshold value, the first node migrates the portion of the areas to the volume of the second node, and when it is determined that the load of the write on the one volume is equal to or more than a second threshold value different from the first threshold value, the first node migrates the portion of the areas to the volume of the second node.

5. The storage system according to claim 1, wherein the first node evenly allocates the areas included in the one volume to the plurality of nodes, and the areas allocated to another node different from the first node is migrated to the volume of the another node.

6. The storage system according to claim 1, wherein the first node migrates the areas included in the one volume one by one to a volume of another node different from the first node until the load of the one volume falls below the threshold value.

7. The storage system according to claim 1, wherein when the one volume is provided to a plurality of the hosts, the first node collectively sets the areas accessed by the plurality of hosts as a migration target for each host and migrates the area that is the migration target for each host to a volume on another node different from the first node.

8. The storage system according to claim 1, wherein the first node migrates another volume different from the one volume among the volumes provided by the own node to another node different from the first node and migrates the portion of the areas from the volume of the second node to the one volume.

9. The storage system according to claim 1, wherein when a path is not set between the volume of the second node to which the portion of the areas is migrated and the host accessing the portion of the areas, the second node and the host set the path.

10. The storage system according to claim 1,
wherein when the portion of the areas included in the one volume is migrated to the second volume, a path is set from a host using the volume to the first node and the second node;
wherein when an access request to access data stored in the volume is received from the host, the access request is transferred to the first node or the second node in which an area storing the data is located; and
wherein when each of the plurality of nodes determines that the access request from the host is biased towards the volume of its own node, each of the plurality of nodes notifies the host that the path from the host to its own node is an optimum path.

11. The storage system according to claim 10, wherein when each of the plurality of nodes determines that the access request from the host is not biased towards a volume of a specific node, each of the plurality of nodes notifies the host with which the path is set that all paths defined in the volume have an optimum attribute.

12. The storage system according to claim 1,
wherein the one or more storage devices are commonly provided in the plurality of nodes; and
wherein when the first node migrates the portion of the areas to the second node, the first node updates data for managing the portion of the areas to migrate the portion of the areas from the first node to the second node, and does not migrate the data in the portion of the areas stored in the one or more storage devices.

13. The storage system according to claim 1, comprising a computer that calculates and outputs a throughput and a response time according to a number of migration destination nodes in the area of the volume for the volume provided by the plurality of nodes.

14. The storage system according to claim 1,
wherein the first node:
provides the volume to a host as a transmission destination of a data input/output request;
receives the data input/output request regarding the volume and judges whether an area relating to the data input/output request exists in its own node or in another node;
causes its own node to process the data input/output request if the area exists in its own node; and
transfers the data input/output request to the other node if the area exists in the other node.

15. The storage system according to claim 14,
wherein the nodes include the storage devices, respectively;
data relating to the volume is made redundant and distributed and stored along with parity data in the storage devices in the plurality of nodes; and
the portion of the areas included in the one volume is migrated between the nodes by updating data for managing the portion of the areas without migrating the data in the storage devices.

16. The storage system according to claim 1,
wherein the first node migrates the portion of the areas included in the one volume to volumes of a plurality of second nodes; and
wherein when the second node which determines that the load of its own node is less than the threshold value, the second node migrates the portion of the areas included in the one volume from the other second nodes.

17. The storage system according to claim 1,
wherein when a third node determines that the load of its own node is less than the threshold value, the third node migrates the areas included in the one volume from the first node or the second node to the third node.

* * * * *